(12) United States Patent
Yamasaki et al.

(10) Patent No.: US 6,695,451 B1
(45) Date of Patent: Feb. 24, 2004

(54) MULTI-PROJECTION IMAGE DISPLAY DEVICE

(75) Inventors: Masami Yamasaki, Sagamihara (JP); Haruo Takeda, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/581,077

(22) PCT Filed: Dec. 12, 1997

(86) PCT No.: PCT/JP97/04588

§ 371 (c)(1),
(2), (4) Date: Jun. 9, 2000

(87) PCT Pub. No.: WO99/31877

PCT Pub. Date: Jun. 24, 1999

(51) Int. Cl.[7] .............................................. G03B 21/14
(52) U.S. Cl. ............................ 353/30; 353/94; 353/122
(58) Field of Search ............................... 353/30, 94, 97, 353/122; 348/745, 806, 840; 345/629, 634, 1.1, 1.3

(56) References Cited

U.S. PATENT DOCUMENTS

| | | | | |
|---|---|---|---|---|
| 5,136,390 | A | * | 8/1992 | Inova et al. ................. 348/383 |
| 5,734,446 | A | * | 3/1998 | Tokoro et al. ............... 348/745 |
| 5,956,000 | A | * | 9/1999 | Kreitman et al. ............ 345/1.3 |
| 6,017,123 | A | * | 1/2000 | Bleha et al. .................. 353/30 |
| 6,222,593 | B1 | * | 4/2001 | Higurashi et al. ........... 348/745 |
| 6,310,650 | B1 | * | 10/2001 | Johnson et al. ............. 348/383 |
| 6,456,339 | B1 | * | 9/2002 | Surati et al. ................. 348/745 |
| 2001/0022651 | A1 | * | 9/2001 | Kubota et al. ............... 353/94 |
| 2002/0054275 | A1 | * | 5/2002 | Yamanaka ................... 353/30 |

FOREIGN PATENT DOCUMENTS

| | | |
|---|---|---|
| JP | 6-178244 A | 6/1994 |
| JP | 6-178244 | 6/1994 |
| JP | 6-178327 A | 6/1994 |
| JP | 7-239504 | 9/1995 |
| JP | 8-50469 | 2/1996 |
| JP | 8-294073 | 11/1996 |

* cited by examiner

Primary Examiner—William Dowling
(74) Attorney, Agent, or Firm—Antonelli,Terry,Stout & Kraus, LLP

(57) ABSTRACT

A multi-projection image display device using a plurality of image projectors to form one picture on a screen, in which images projected from the projectors are smoothly connected with one another, so that seams of the images do not appear conspicuously. The image display device has projectors and a screen laid out in such a manner that maximum image projection ranges of the respective projectors overlap the adjacent ranges. An image signal control unit for processing an image signal supplied from an external image input has, therein, a member for cutting out a partial image area dealt with by each projector, an image converting member for performing geometric transformation and local color correction of the partial image, and an arithmetic control member for controlling the image converting member on the basis of image information inputted from a screen state monitor camera. With this structure, smoothing of the seams between the images may be realized simply by image signal processing, and precise adjustment of the optical system of the projectors becomes unnecessary.

6 Claims, 22 Drawing Sheets

FIG.7

Video signal quantization

0700

Analog image signal is split into image color signal and synchronizing signal by signal splitter 0611.

0701

Image color signal is quantized by A/D converter 0612.

0702

According to separated synchronizing signal, horizontal and vertical position of currently quantized pixels are calculated by address generator (0613) and output as pixel addresses.

END

FIG.17

Geometric transformation vector generation.

1700
Point-set on border lines, as defined by eqs. 4 and 5, of maximum image projection ranges is produced by linear interpolation based on positional coordinates of characteristic points on border lines of projected images from the projectors.

1701
Border line intersections of neighboring ranges are calculated from the point-set on border lines of maximum image projection ranges.

1702
Effective partial border lines as defined by eqs. 6 and 7 are calculated from border line intersections.

1703
Points to which effective partial border line end points move are calculated using eq.9.

1704
End point movement vectors for effective partial border lines are calculated using eqs.13 and 14.

1705
Movement direction vectors for effective partial border lines are calculated using eqs.15 and 16.

1706
Border lines of optimized image projection ranges are calculated using eqs.19 and 20.

1707
Geometric transformation control parameters for the entire maximum image projection ranges are calculated using eq.31.

END

MULTI-PROJECTION IMAGE DISPLAY DEVICE

TECHNICAL FIELD

This invention relates to an image display device which combines two or more images for display. More particularly it relates to a multi-projection image display device which combines images projected from a plurality of projection type display units to form one picture on a screen, and concerns a device or method which is capable of smoothing the seams between images.

BACKGROUND OF THE INVENTION

In combining several images, for example, using a multi-projector device composed of a plurality of projectors, it is ideal when the seams between images projected from neighboring projectors can be so smoothly joined as to look invisible, forming one picture (or pictures) on a screen.

Conventionally, the method as disclosed in Japanese Patent Prepublication No. 94974/96 has been employed to realize this objective. For example, to prevent the projection range of each projector on the screen from overlapping that of an adjacent projector, a shielding plate is installed in the border between neighboring image projection ranges perpendicularly to the screen in such a way that light from one projector does not enter the projection range of the light of an adjacent projector. In addition, transmission type screens with different polarization characteristics are provided between neighboring projection ranges so that light from adjacent projectors cannot reach the viewer physically.

In the above mentioned optical method for combining neighboring images, however, it is necessary to physically define the image projection range of each projector beforehand. This necessitates adjustment of projectors so that the projected image precisely coincides with the defined projection range. This adjustment includes adjusting the projector angle and the internal optical system of each projector, or in case of cathode-ray tube type projectors, adjusting deflecting voltage waveforms to reshape the projected images.

However, in case of liquid crystal projectors, the reshaping of projected images is not so easy as in the case of cathode-ray tube type projectors and only optical adjustments are used to change the image projection position and shape, though the freedom of adjustment is limited.

These adjustment methods are not only troublesome, but they also need frequent readjustments because optimum adjustment levels easily vary with variation in the temperature and the magnetic field in the room in which the adjusted projectors are installed. Therefore, when the conventional methods are used, it is very difficult to display on a screen a whole picture (or pictures) composed of several images with smooth seams.

Also, installation of shielding plates on the screen might unfavorably affect the uniformity of the screen itself, which might be reflected in the projected images, so that a smoothly joined picture can not be obtained.

SUMMARY OF THE INVENTION

The main object of the this invention is to solve the above-mentioned in a way that problem. Eliminates the need for a special screen structure for prevention of penetration of light from adjacent projectors, as well as precise optical adjustment of projectors, while realizing smoothly joined images in which the seams are not conspicuous. According to the invention, even image projection by projectors can be made by image signal processing.

To achieve the above stated object, the invention has the following structure.

According to the invention, adjustment is made on overlapping parts (signals) of several images on a projection surface (for example, a screen). Specifically, in terms of image signals supplied to projectors which project images from the back or front of the screen, a partial image area to be dealt with by each projector is cut out to generate a corresponding image signal, which is processed to perform reshaping or geometric transformation of the projected image and local color correction. This process may be implemented using either hardware or software.

In addition, the invention is characterized in that, as an image display method employed in a multi-projection image display device provided with a plurality of image output units, on a display screen which displays images projected from said image output units, the image projection area of one of said image output units overlaps that of another image output unit, and said image output unit and said other image output unit deliver mutually correlated. images to the image overlap area.

Here, a control parameter to be used for the geometric transformation and color correction may be generated as follows: the image signal for a desired image pattern is supplied to each projector, the state of the projected image on the screen is read and the control parameter is calculated from the image state data thus read.

For each projector, which is in charge of an image projection range adjacent to another image projection range, it is desirable to set its position, angle and optical system so that its maximum image projection range on the screen overlaps that of the adjacent maximum image projection range by a few percent in the border. The areas where neighboring maximum image projection ranges overlap each other are areas where the images projected from the respective neighboring projectors in charge of these projection ranges are optically added or integrated. The state of the image projection on the screen as a result of this optical image addition is read and the read image data is used to calculate control parameters to make an optical image addition model, and this model is used to obtain necessary control parameters for geometric transformation and local color correction of the supplied images (signals) so that smooth connection of neighboring images can be made as a result of optical image addition. According to the obtained geometric transformation and local color correction parameters, image geometric transformation and local color correction are carried out and the processed image signals are supplied to the projectors.

The invention constitutes a multi-projection image display device to form one or more pictures on a screen, characterized in that image projectors which project images on said screen and a control unit which, when the image projection display range on said screen of one of the projectors has an area which overlaps that of another projector, enables said projector and said other projector to output mutually correlated images to said overlap area on said screen.

The invention also includes a computer readable storage medium which stores a program to ensure that, on a screen where image output units display images, the image display range of one of said image output units and that of another image output unit partially overlap, and that said image output unit and said other image output unit output mutually correlated images. The invention also constitutes an image signal regenerator which comprises storage media to store image data in divided form for the respective image output units, so that said image output unit and said other image output unit can output mutually correlated images to the area where images from the image output units overlap; and image signal supply units which supply image signals based on image data read from said storage media.

The invention eliminates the need for readjustments of components, such as the screen and projectors, because it only needs adjustments relating to image overlap areas. Specifically, it involves making an optical image addition model, depending on the conditions of the screen, projectors and other components, and using the model to obtain a solution; as a result, components such as the screen and projectors need not be readjusted as far as an optical image addition model which has a solution can be obtained.

BRIEF DESCRIPTION OF DRAWINGS

FIG. 7 is a flow chart of the operational sequence for a video signal digitizer.

FIG. 17 is a flow chart of the sequence for geometric transformation vector generation.

BEST MODE FOR CARRYING OUT THE INVENTION

Figure 1:
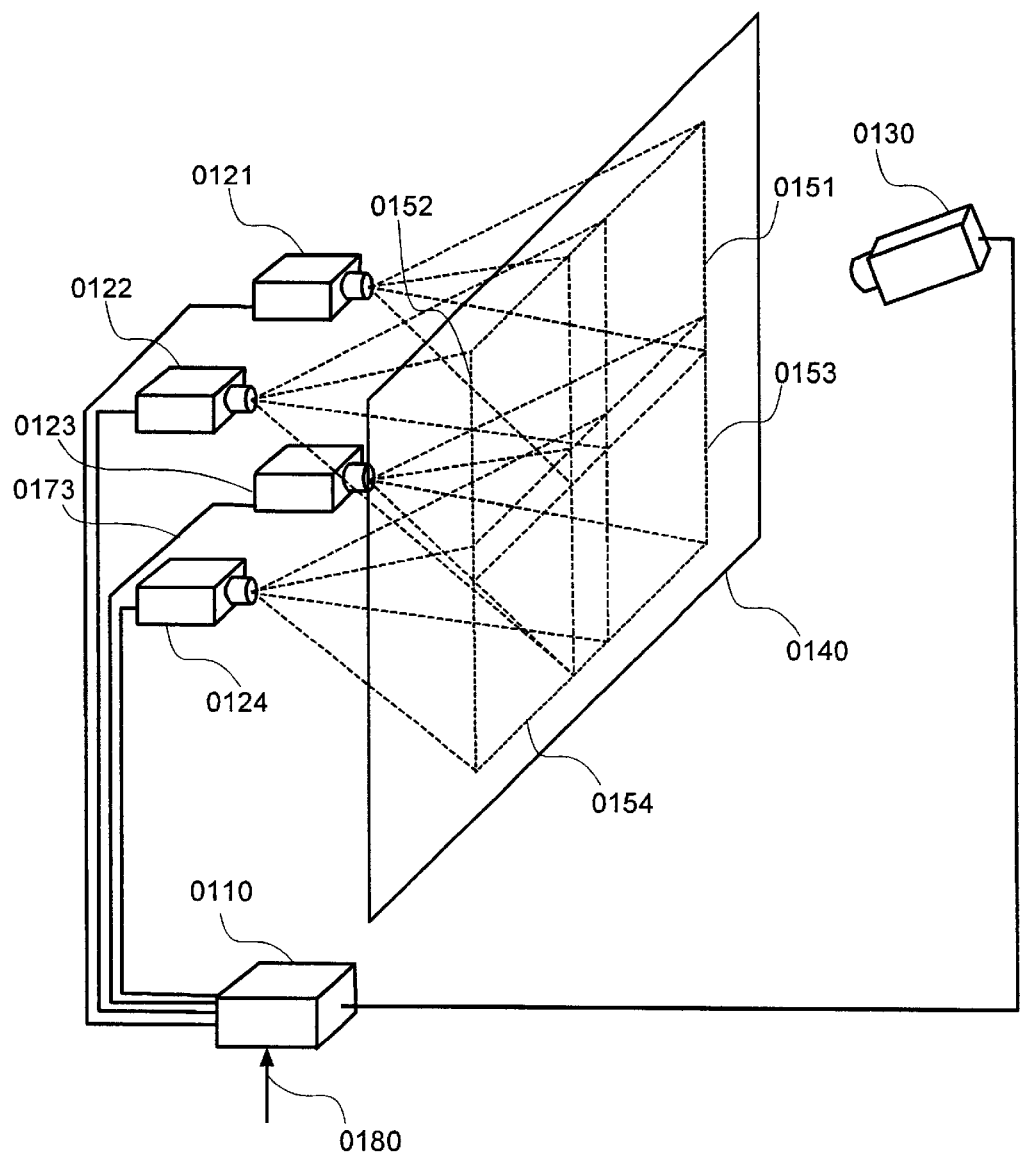
FIG. 1 is a diagram which shows the arrangement of projectors, a screen, and a screen state monitor camera representing an embodiment of this invention.

FIG. 1 shows a system having an array of projectors according to this invention. Four projectors 0121, 0122, 0123, 0124 are arranged in such a way that their maximum image projection ranges 0151, 0152, 0153, 0154 overlap a bit one on another on a rear projection screen 0140. Image signals are supplied from an image signal control unit 0110 to the four projectors 0121, 0122, 0123, 0124. The image signal control unit 0110 operates to process image signals supplied from an external image input 0180 and supply such processed signals to the four projectors 0121, 0122, 0123, 0124 and performs an image correction function to determine how the images are processed. The way the image signal control unit 0110 corrects images is determined according to image signals from a screen state monitor camera 0130 that reads the state of images projected on the screen 0140.

Figure 2:
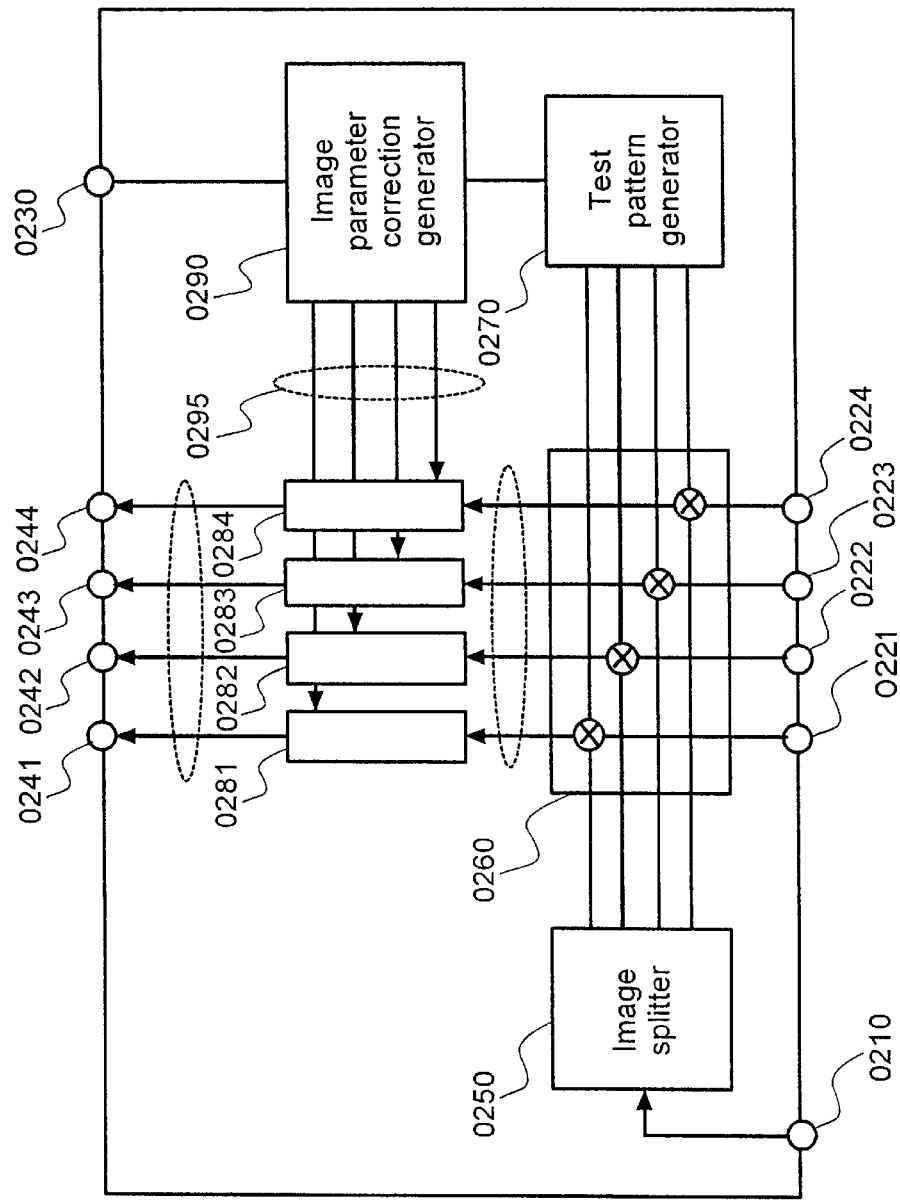
FIG. 2 is a functional block diagram of an image signal control unit.

FIG. 2 is a block diagram showing the functional structure of the image signal control unit 0110. The image signal control unit has the following input and output terminals: a whole image input 0210, partial image inputs 0221, 0222, 0223, 0224, a screen state monitor camera image input 0230, and partial image outputs 0241, 0242, 0243, 0244.

The image signal supplied from the whole image input 0210 is split by an image splitter 0250 into partial image signals that correspond to the projectors connected to the partial image outputs 0241, 0242, 0243, 0244, respectively; and, these partial image signals are each sent to an image signal selector 0260.

The image signal selector 0260 selects one of the following image signal sets: the image signal set as input from the image splitter 0250, the image signal set as input from a test pattern generator 0270, and the set of partial image inputs 0221, 0222, 0223, 0224. Then, it supplies the selected set of image signals to the corresponding image correctors 0281, 0282, 0283, 0284, respectively.

An image correction parameter generator 0290 controls the test pattern generator 0270 to select geometric pattern image signals by means of the image signal selector 0260 and send them through the image correctors 0281, 0282, 0283, 0284 to the projectors 0121, 0122, 0123, 0124 connected to the partial image outputs 0241, 0242, 0243, 0244; and, it loads image signals from the screen state monitor camera 0130 which monitors, through a screen state monitor camera image input 0230, the projection of that geometric pattern on the screen. Based on the image obtained through the screen state monitor camera image input 0230, the image correction parameter generator 0290 works out image correction parameters that enable the images projected from the projectors 0121, 0122, 0123, 0124 to be smoothly connected with least conspicuous seams on the screen with smooth brightness distribution. The worked-out parameters are sent through image correction control lines 0295 and loaded on the image correctors 0281, 0282, 0283, 0284.

Figure 3:
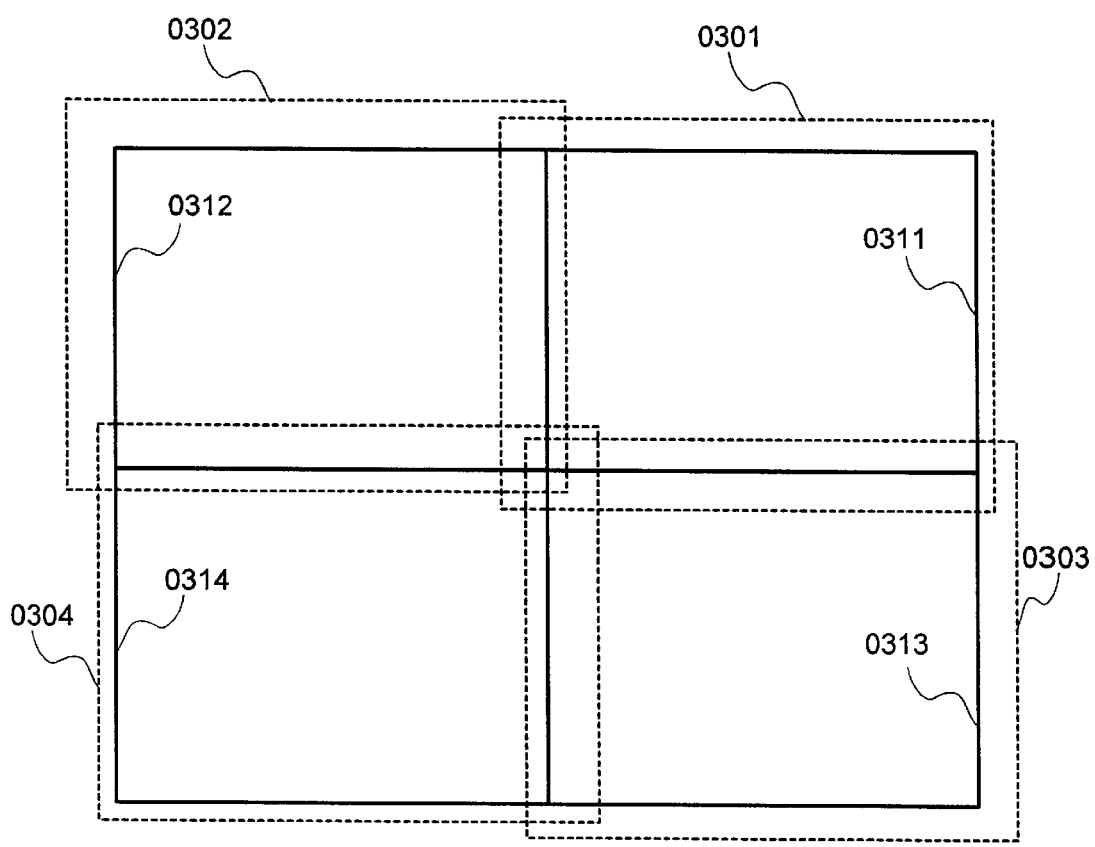
FIG. 3 is a diagram which shows positional relationships on the screen between the maximum image projection ranges of projectors and the projection ranges of images processed by the image signal control unit.

FIG. 3 shows the relationship between the maximum image projection ranges 0151, 0152, 0153, 0154 as shown in FIG. 1 and the projected images as processed by the image signal control unit 0110. The maximum image projection ranges 0301, 0302, 0303, 0304 represent the areas of the maximum images that the projectors 0121, 0122, 0123, and 0124 can project on the screen 0140, respectively. The projectors 0121, 0122, 0123, 0124 are positioned so that their maximum image projection ranges 0301, 0302, 0303, 0304 overlap one another, with overlap areas being disposed between neighboring projection ranges.

The optimized image projection ranges 0311, 0312, 0313, 0314, which are inside the corresponding maximum image projection ranges 0301, 0302, 0303, 0304, represent image display areas which enable the images projected from neighboring projectors to look smoothly joined.

Figure 4:
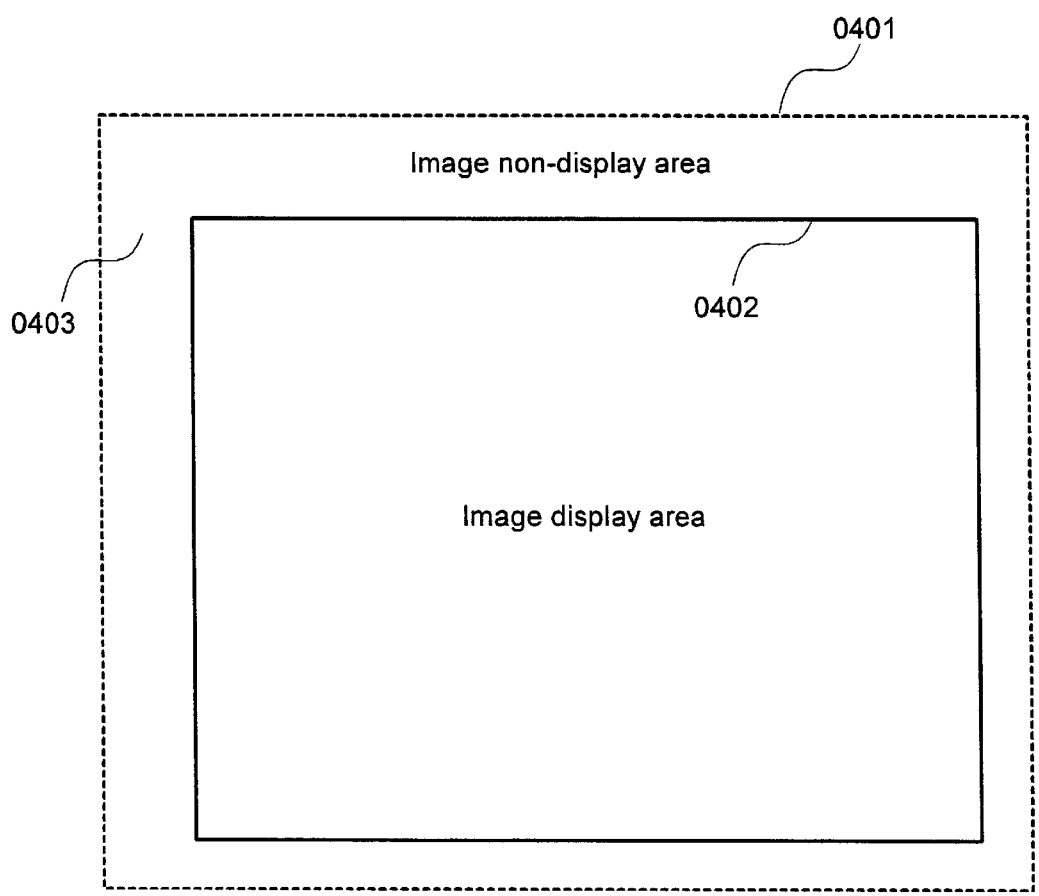
FIG. 4 is a diagram which shows the positional relationship between the maximum image projection range of a single projector and the projection range of an image processed by the image signal control unit.

FIG. 4 is an enlarged view of one of the maximum image projection ranges shown in FIG. 1. A maximum image projection range border 0401 indicates the range within which a projector can display an image. An optimized image projection range border 0402 shows the area to which the image supplied to the projector is sized down so that images projected from neighboring projectors look smoothly joined. The image signal control unit 0110 processes the input image signal so that the zone 0403 disposed between the maximum image projection range border 0401 and optimized image projection range border 0402 has a pixel value which represents the darkest brightness. This prevents more than one projected image from being displayed in this zone because it is included in the area where the neighboring projector can project an image.

Figure 5:
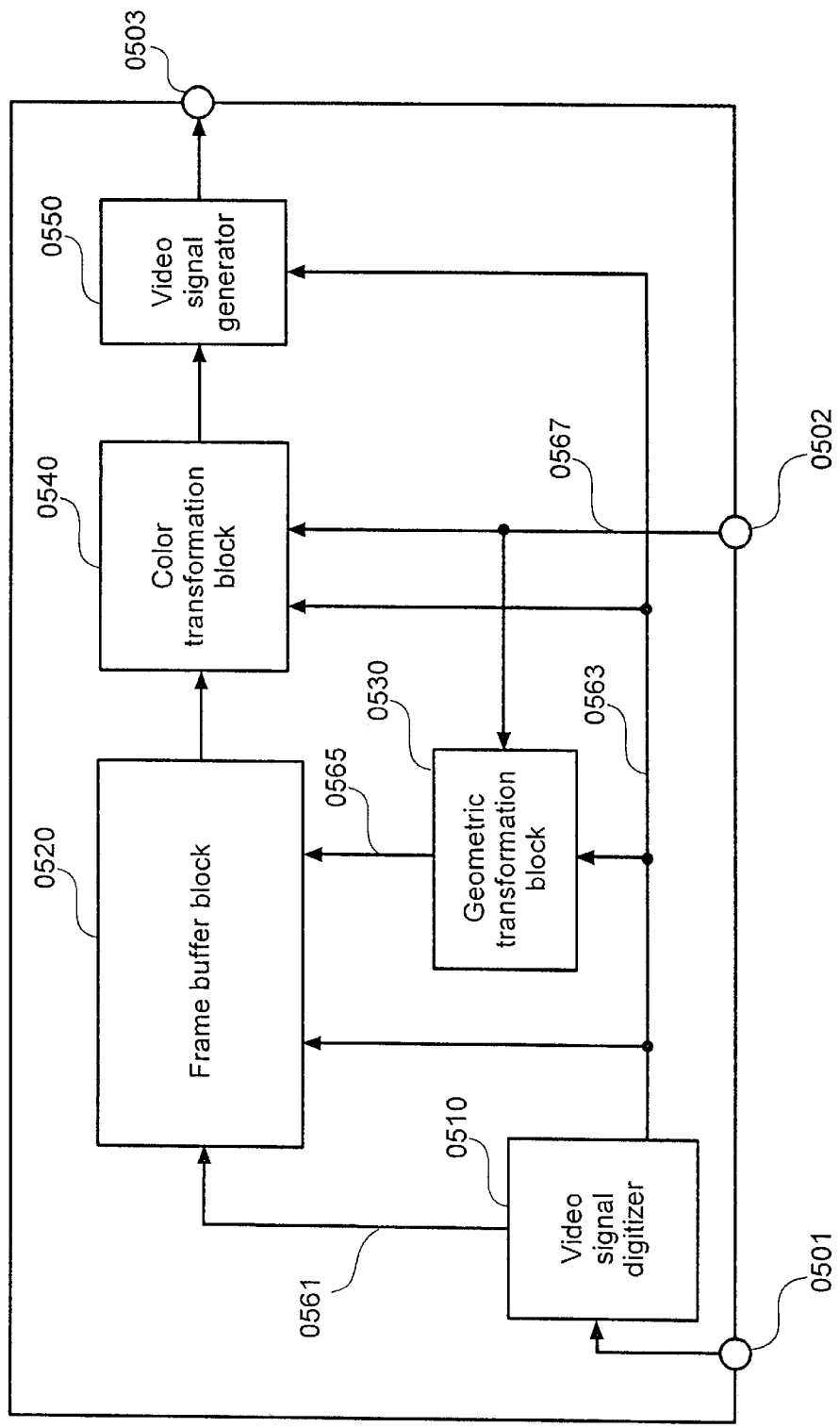
FIG. 5 is a functional block diagram of an image corrector.

FIG. 5 is a functional block diagram of an image corrector. An analog image signal is inputted through an image signal input terminal 0501 and converted by a video signal digitizer 0510 into digital data to be processed within the image corrector. The image data in the digitized form for each image frame is carried through an image data transmission line 0561 to a frame buffer block 0520 where it is stored.

Geometric transformation and color correction parameters for the image are inputted through a control parameter input terminal 0502, carried through a control parameter transmission line 0567 and loaded into a geometric transformation block 0530 and a color transformation block 0540, respectively. In order to modify the output image shape according to the loaded parameter data, the geometric transformation block 0530 loads, through an image data write address transmission line 0563, the address of a pixel to be outputted from an image signal output terminal 0503, calculates the address for the input image pixel to be outputted to that address, and sends the calculation result onto an image data read address transmission line 0565; as a result the corresponding input image pixel data stored in the frame buffer block 0520 is read out.

Figure 6:
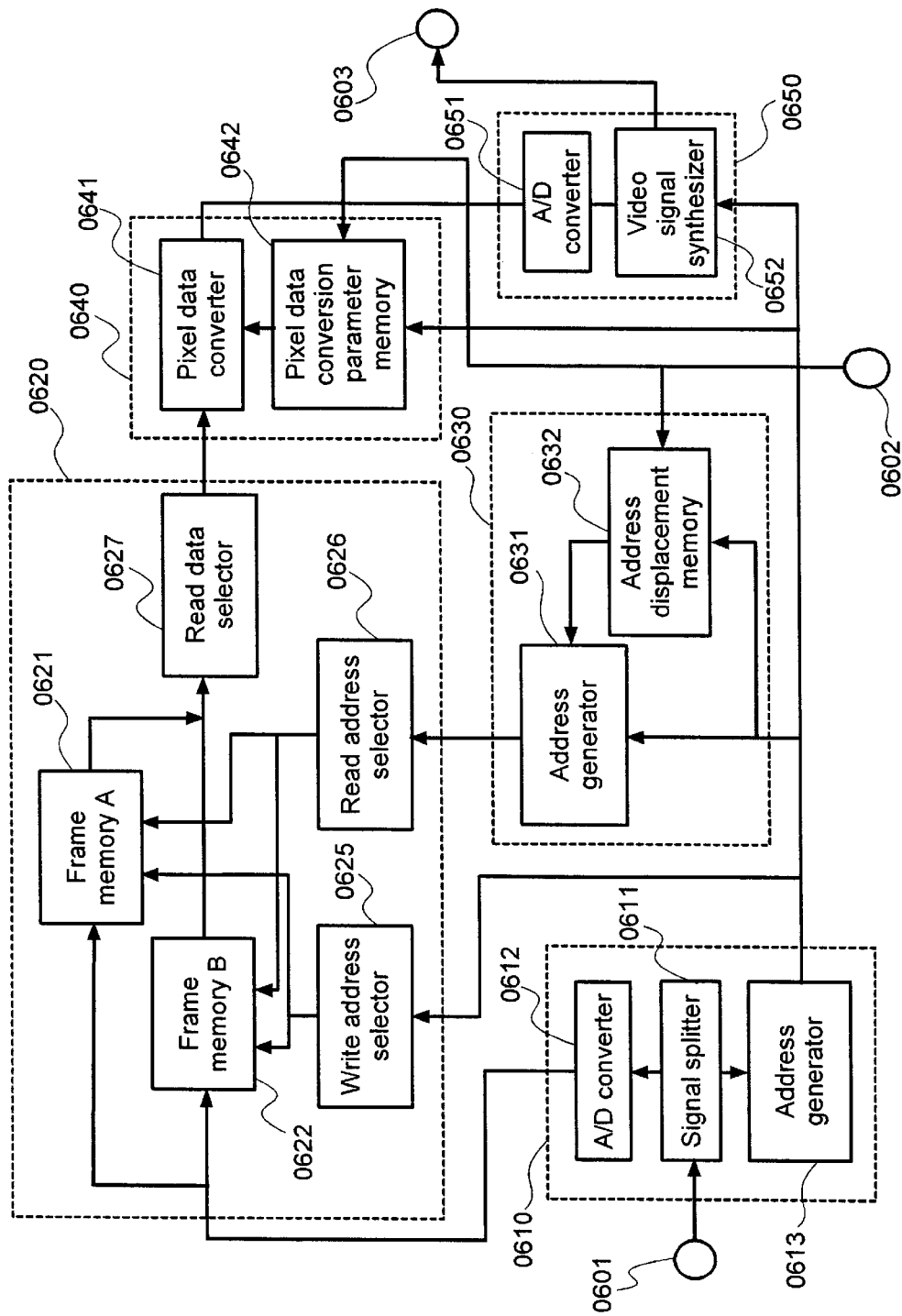
FIG. 6 is a more detailed functional block diagram of the image corrector shown in FIG. 5.

The pixel data thus read is color-transformed by the color transformation block 0540 according to the preset parameter data and transferred to a video signal generator 0550, which then outputs it as a video signal. The algorithm of operation of each functional block shown in FIG. 5 will be explained, with reference to FIG. 6 that shows the structure of the implemented functional blocks in FIG. 5, as well as a PAD diagram. In FIG. 6, the video signal digitizer 0610 incorporates a signal splitter 0611 as a means for splitting the input signal from an image signal input terminal 0601 an image color signal a synchronizing signal; an A/D converter 0612 as a means for quantization an image color signal voltage; and an address generator 0613 as a means for generating information on the position of a currently quantized pixel within the image.

The frame buffer block 0620 consists of two frame memories A and B (0621 and 0622), a write address selector 0625, a read address selector 0626 and a read data selector 0627. The frame memories A and B each store image data for one frame and the write address selector 0625 selects which frame memory is to be used for writing input pixel data and sends the write address and write timing to the selected frame memory. The read address selector 0626 selects, as a read memory, the frame memory where data is not written, and sends the address of a pixel to be read to the selected frame memory, and the read data selector 0627 selects the pixel data sent from the read frame memory and outputs it. The geometric transformation block 0630 contains an address generator 0631 and an address displacement memory 0632. The address generator 0631 calculates which address in the frame memory chosen as a read memory should be used for output of the stored pixel data when the image corrector is going to output the pixel into a position within the image. The address displacement memory 0632 stores all necessary parameters for the calculation for each output pixel position. The color transformation block 0640 has a pixel data converter 0641 and a pixel data conversion parameter memory 0642, where the pixel data converter calculates pixel data to be outputted by the image corrector according to the pixel data read from the frame buffer block 0620 and the pixel data conversion parameter memory 0642 memorizes how pixel data conversion should take place for each output pixel position.

The video signal generator 0650 has a D/A converter 0651 and a video signal synthesizer, where the D/A converter converts output pixel data into a image color signal and the video signal synthesizer generates a synchronizing signal based on pixel output position data and combines it with the image color signal for conversion into a video signal. FIG. 7 shows the operational sequence for the video signal digitizer 0610. In step 0700, an image signal is split into an image color signal a synchronizing signal. In step 0701, the image color signal is quantized. In step 0702, a pixel address (pixel column and row data) is generated according to the synchronizing signal.

The numeric image data thus quantized is first stored in the frame buffer block 0620. For the stored numeric image data, the geometric transformation block 0630 generates a read address for geometric transformation and the pixel data read undergoes color correction by the color transformation block 0640.

Figure 8:
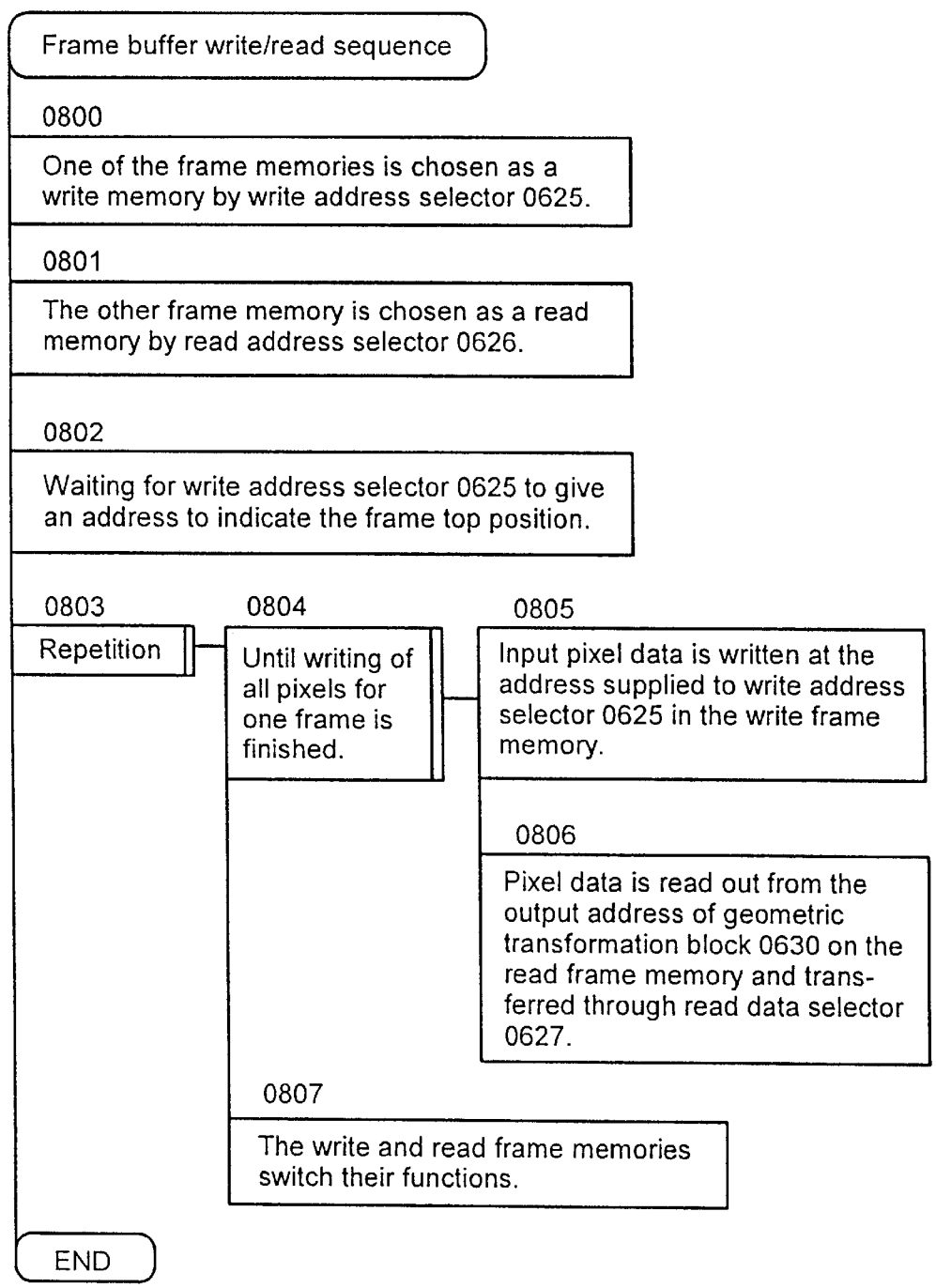
FIG. 8 is a flow chart of a frame buffer writing or reading sequence.

FIG. 8 shows the operational sequence for the frame buffer block 0620. Steps 0800 and 0801 are performed to choose one of the two frame buffer memories for reading and the other for writing. In step 0802, a waiting time is taken until data to be written at the write starting position in the top left corner of the screen is supplied to the frame buffer block 0620. In step 0805, pixel data is written in the write frame buffer memory. In step 0806, pixel data is read from the read frame buffer memory according to the address sent from the geometric transformation block 0630, and the pixel data is transferred through the read data selector 0627 to the color transformation block 0640. Steps 0805 and 0806 are repeated until all pixels for a whole image frame are written, and then step 0807 is performed to switch the functions of the write and read frame buffer memories. Then, the steps from 0805 are repeated.

Figure 9:
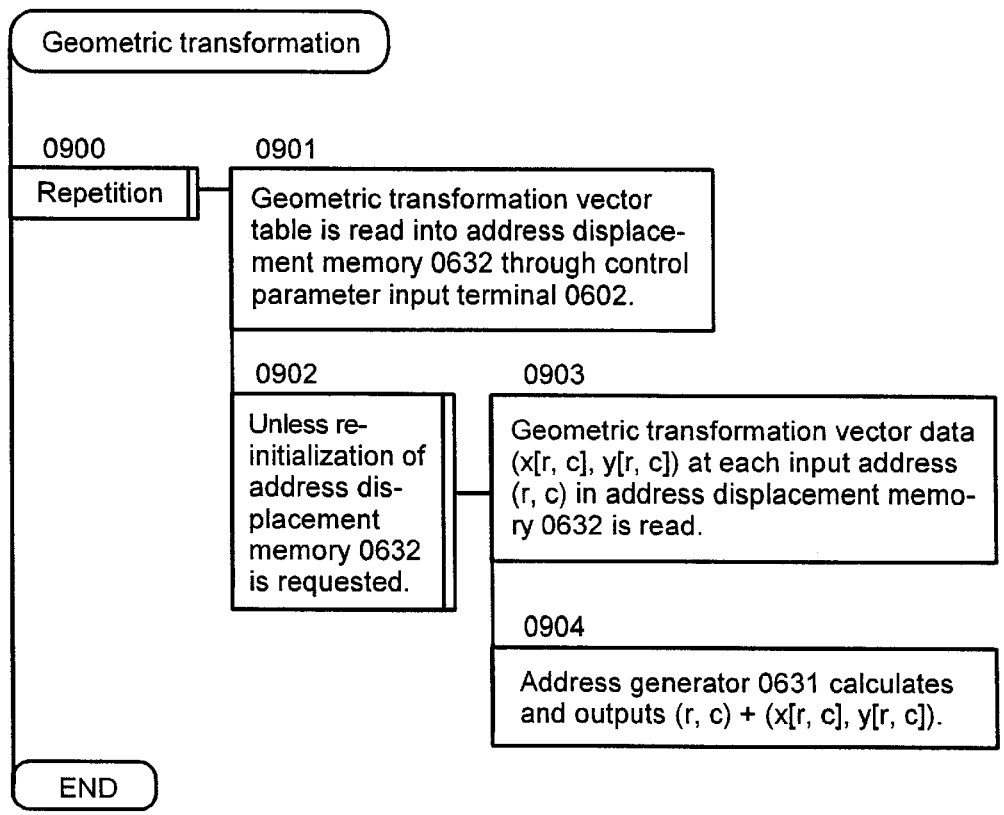
FIG. 9 is a flow chart of the sequence for geometric transformation of images.
Figure 10:
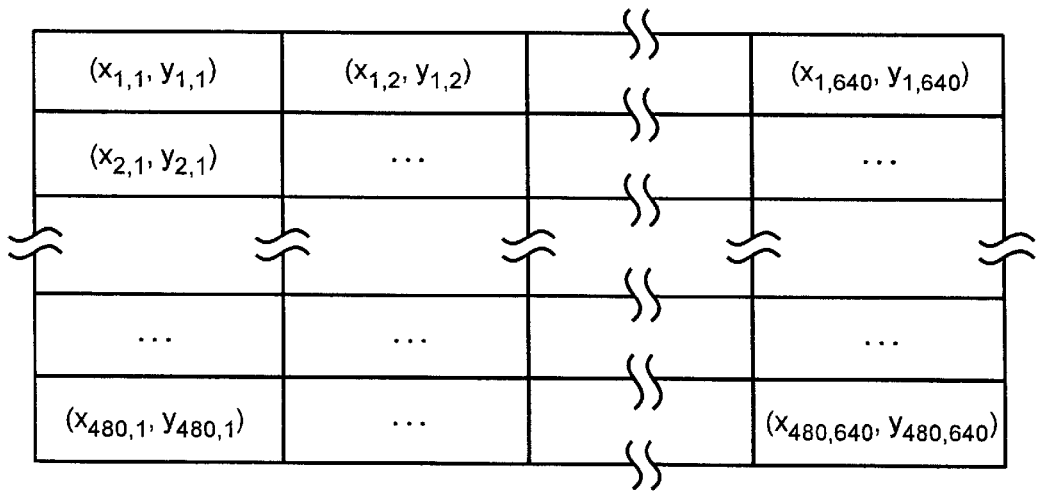
FIG. 10 is a diagram which shows a geometric transformation vector table data structure.

FIG. 9 shows the operational sequence for the geometric transformation block 0630. In step 0901, a geometric transformation vector table as shown in FIG. 10 is loaded into the address displacement memory 0632.

The geometric transformation vector table is formed of two-dimensional data composed of two-dimensional vectors which correspond to pixels in one frame of the image on the basis of one vector for one pixel. In step 0903, the row and column data (x[r, c], y[r, c]) of the geometric transformation vector table stored in the address displacement memory 0632 is read for each of the addresses (r, c) supplied in sequence from the video signal digitizer 0610. In step 0904, (r, c) +(x[r, c], y[r, c]) is calculated and the result is outputted as the read address for the frame buffer block 0620. Steps 0903 and 0904 are repeated as long as re-initialization of the address displacement memory 0632 is not requested from the control parameter input terminal 0602. If such re-initialization is requested, the steps from step 0901 are repeated again.

Figure 11:
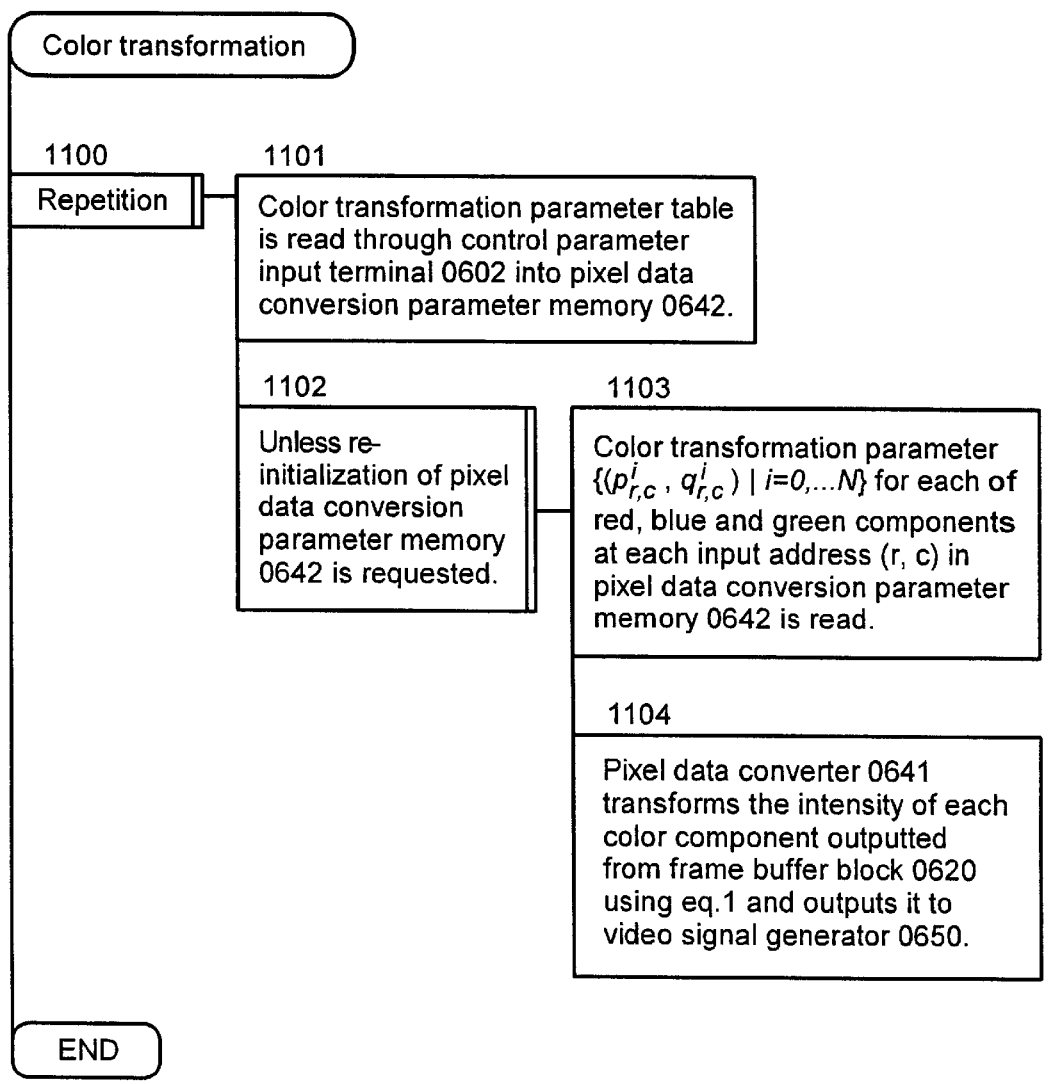
FIG. 11 is a flow chart of a color transformation sequence.
Figure 12:
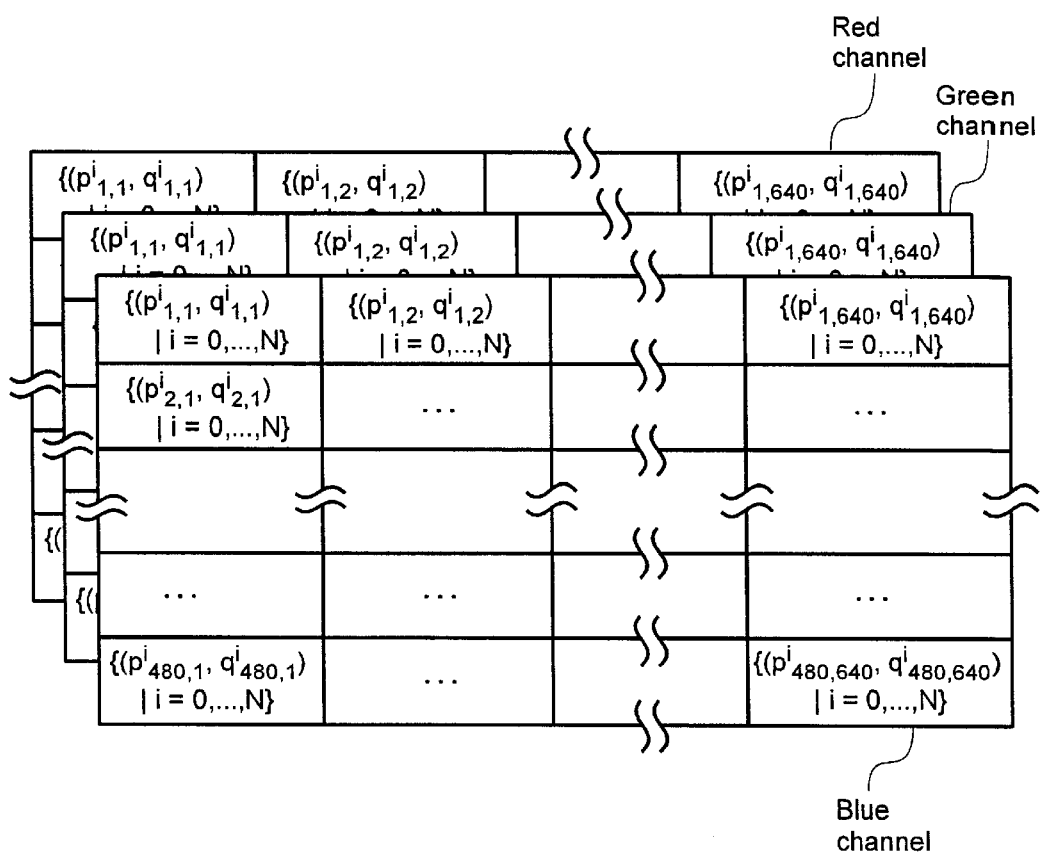
FIG. 12 is a diagram which shows a color transformation parameter table data structure.

FIG. 11 shows the operational sequence for the color transformation block 0640. In step 1101, a color transformation parameter table as shown in FIG. 12 is loaded into the pixel data conversion parameter memory 0642 and initialized. The color transformation parameter table is formed of two-dimensional data for three planes which consist of parameters as a result of approximation as N piecewise linear functions of the respective transformation functions for the three color components (red, blue, green) of each pixel in one frame of the image. In step 1103, regarding each of the addresses (r, c) supplied in sequence from the video signal digitizer 0610, color transformation parameters are read for each of the red, blue and green components at the address (row and column) of the color transformation parameter table in the pixel data conversion parameter memory 0642. If the intensity of each color component of the pixel outputted from the frame buffer block 0620 is expressed as "z", the intensities of the color components are transformed using a transformation equation (equation 1) and transferred to the video signal generator 0650 (step 1104).

$$f(z) = (q^{i+1}_{r,c} - q^i_{r,c})\frac{z - p^i_{r,c}}{p^{i+1}_{r,c} - p^i_{r,c}} + q^i_{r,c} \text{ if } z \in [p^i_{r,c}, p^{i+1}_{r,c}]$$ [eq. 1]

Steps 1103 and 1104 are repeated as long as the control parameter input terminal 0602 does not request re-initialization of the pixel data conversion parameter a memory 0642. If such request is made, the steps from step 1101 are repeated.

The pixel data supplied from the color transformation block 0640 is converted into an analog video signal by the video signal generator 0650 and the pixel data is outputted through the image signal output terminal 0603. Parameter data to be loaded into the geometric transformation block 0630 and color transformation block 0640 as shown in FIGS. 10 and 12 is created by the image correction parameter generator 0290 according to the state of the image on the screen 0140 as monitored by the screen state monitor camera 0130. The geometric transformation parameter as shown in FIG. 10 is calculated as follows.

Figure 13:
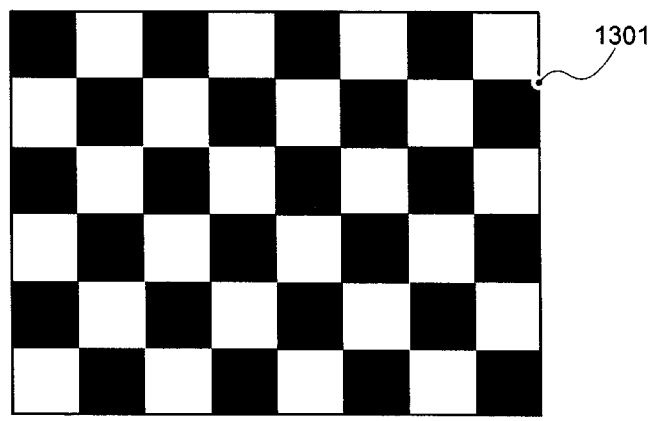
FIG. 13 is a diagram which shows an example of an image pattern for correction.

A pattern for correction as shown in FIG. 13 is projected from the projectors through the image correctors 0281, 0282, 0283, 0284 onto the screen and the projected image is photographed by the screen state monitor camera 0130 and an apex 1301 or similar point is chosen as a characteristic point in the image. Assuming that, as for a characteristic point like this, position coordinates q in the camera coordinate system can be correlated with coordinates p in the frame memory of the pixel corresponding to that point, position coordinates p in the coordinate system of the frame memory corresponding to an arbitrary point q in the camera coordinate system for an area where no such pattern is displayed can be calculated as follows. Regarding q_1, q_2 and q_3 as three points near q, the points that correspond to coordinates p_1, p_2 and p 3 in the frame memory coordinate system are calculated. Then, if the relation between q, and q_1, q_2, q_3 is expressed by equation 2 which uses appropriate real numbers a and b, p can be represented by equation 3.

$$q=q_c+a(q_a-q_c)+b(q_b-q_c)$$ [eq. 2]

$$p=p_c+a(p_a-p_c)+b(p_b-p_c)$$ [eq. 3]

Figure 14:
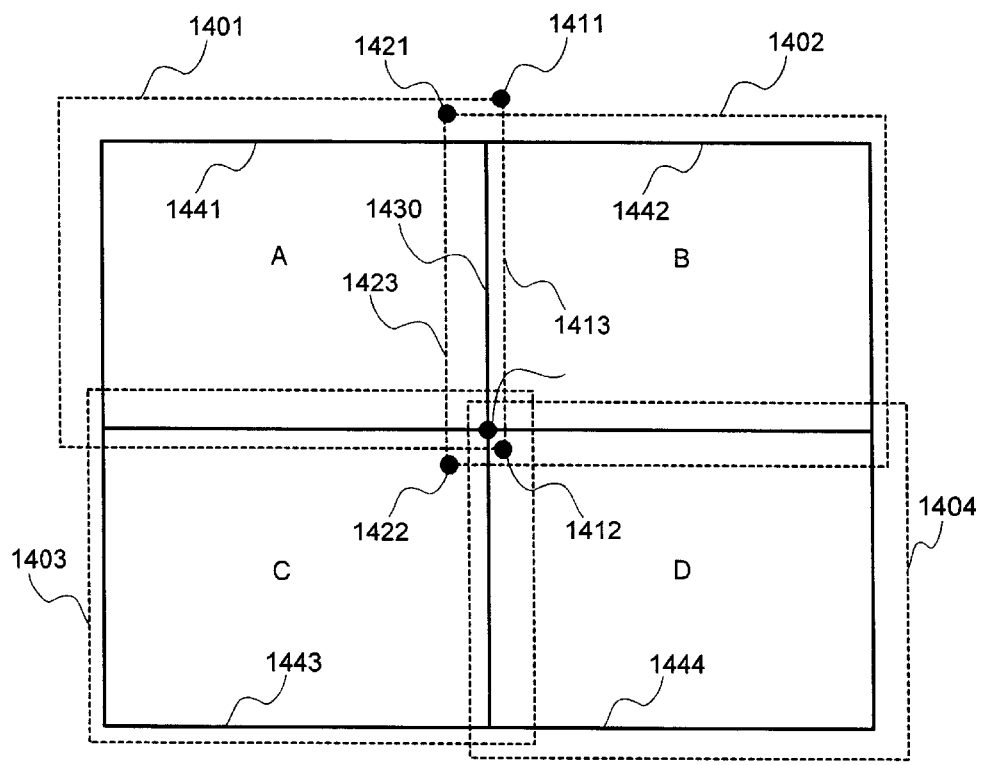
FIG. 14 is a diagram which shows the image projection ranges before and after geometric transformation.

As shown in FIG. 14, if the maximum image projection ranges 1401, 1402, 1403, 1404 of the four projectors overlap one another, the coordinates of the apex 1421 (of the maximum image projection range 1402 of an adjacent projector B) which exists within the maximum image projection range 1401 of projector A are read as coordinates in the frame memory coordinate system of the image corrector connected to projector A, using the above-mentioned coordinates transformation method. In other words, it is possible to define an isomorphism $\Psi\_\{AB\}$ which correlates coordinate value x_B of an arbitrary point on the screen, in the frame memory coordinate system of the image corrector connected to projector B, with coordinate value x_A in the frame memory coordinate system of the image corrector connected to projector A.

Therefore, the coordinate values of an arbitrary position within the projected image discussed below are assumed to be coordinate values in the frame memory coordinate system of the image corrector connected to one of the projectors. Here, the maximum image projection ranges of two neighboring projectors which border on each other horizontally or vertically are represented by S_A and S_B, respectively and the partial border lines in this adjacent area which should border on each other are represented by B_{AB} and B_{BA} respectively.

In FIG. 14, these partial border lines correspond to, for example, the partial border line 1413 of the maximum image projection range 1401 with apexes 1411 and 1412 as end points and the partial border line 1423 of the maximum image projection range 1402 with apexes 1421 and 1422 as end points. Partial border lines B_{AB} and B_{BA} are expressed as point-sets by equations 4 and 5.

$$\{b_{AB}(t)|t\in[0,1]\}$$ [eq. 4]

$$\{b_{BA}(t)|t\in[0,1]\}$$ [eq. 5]

In border lines B_{AB} and B_{BA}, the segments which are included in or border on the adjacent maximum image projection range are called effective partial border lines. Here, the respective border line segments are defined by equations 6 and 7 as follows.

$$\{b'_{AB}(t)=b_{AB}((1-t)fi_{AB}+tfA_{AB})|t\in[0,1]\}$$ [eq. 6]

$$\{b'_{BA}(t)=b_{BA}((1-t)fi_{BA}+tfA_{BA})|t\in[0,1]\}$$ [eq. 7]

where $\alpha\_\{AB\}$ and $\beta\_\{AB\}$ in equation 6 are defined by equation 8 for the four cases as shown in Table 1.

TABLE 1

| | |
|---|---|
| Case 1 | $b_{AB}(t)$ does not intersect with $B_{BA-}$ and $B_{BA+}$. |
| Case 2 | $b_{AB}(t)$ intersects with $B_{BA+}$ at $b_{AB}(c)$. $b_{AB}(0) \in S_B$ |
| Case 3 | $b_{AB}(t)$ intersects with $B_{BA-}$ at $b_{AB}(c)$. $b_{AB}(1) \in S_B$ |
| Case 4 | $b_{AB}(t)$ intersects with $B_{BA-}$ at $b_{AB}(c0)$ and with $B_{BA+}$ at $b_{AB}(c1)$, where $c0 < c1$. |

$$(\alpha_{AB}, \beta_{AB}) = \begin{cases} (0, 1): case1 \\ (0, c): case2 \\ (c, 1): case3 \\ (c_0, c_1): case4 \end{cases} \quad [eq.\ 8]$$

$\alpha\_\{BA\}$ and $\beta\_\{BA\}$ are defined in the same way as above.

Figure 15:
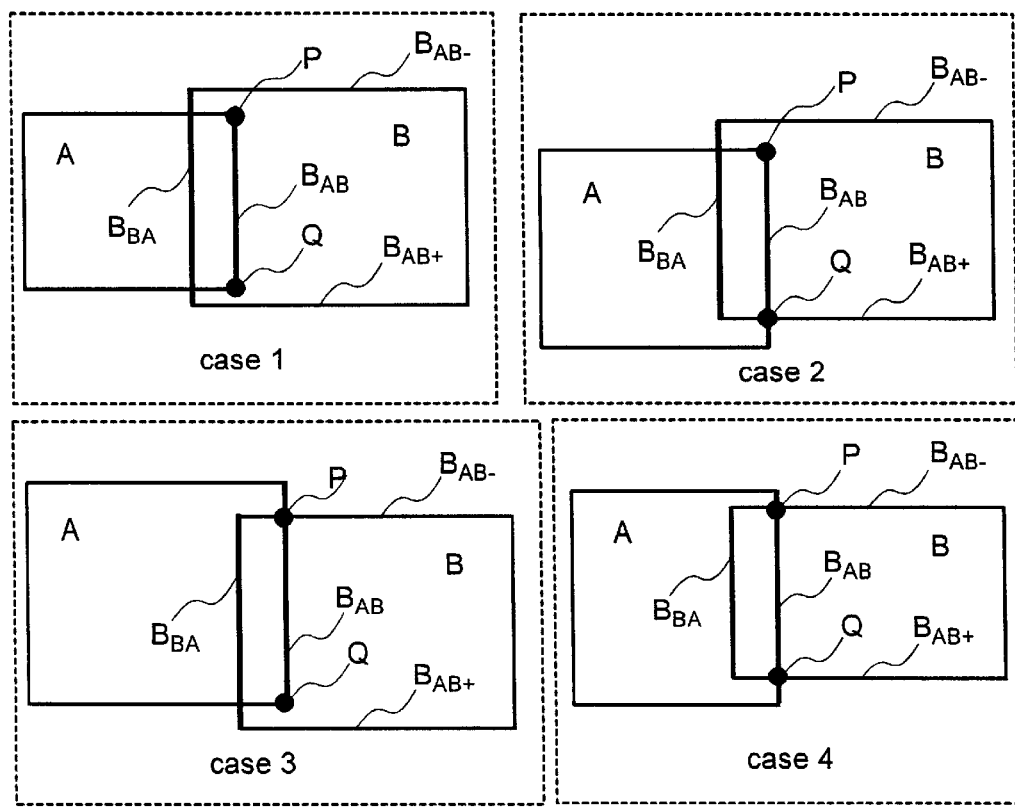
FIG. 15 is a diagram which shows four types of overlap of two neighboring maximum image projection ranges.

The four cases for equation 8 correspond to the four types of overlap of two neighboring maximum image projection ranges as shown in FIG. 15, where the upper partial border line and lower one which join the partial border line B_{BA} of range B, are represented by B_{AB-} and B_{AB+}, respectively.

Including the possibility that the adjacent maximum image projection range S_B is empty, there are four possible states of a partial border line end point b_{AB} (a) (a∈{0, 1} as shown in Table 2.

TABLE 2

| | |
|---|---|
| Case α | Ideally, $b_{AB}(a)$ should be in the border area of four maximum image projection ranges $S_A$, $S_B$, $S_C$ and $S_D$. |
| Case β | Ideally, $b_{AB}(a)$ should be in the border area of two maximum image projection ranges $S_A$ and $S_B$. |
| Case γ | $S_B$ is empty and its adjacent range $S_C$. where $b_{AB}(a) = b_{AC}(1 - a)$, is not empty. |
| Case δ | $S_B$ is empty and its adjacent range $S_C$. where $b_{AB}(a) = b_{AC}(1 - a)$, is empty. |

Here, the destination point, e_{AB} (a), to which the border line end point b_{AB} (a) moves, is defined by equation 9.

$$e_{AB}(a) = \begin{cases} barycenter\ of\ S_A \cap S_B \cap S_C \cap S_D & case\alpha \\ \dfrac{b'_{AB}(a) + b'_{BA}(1-a)}{2} & case\beta \\ e_{AC}(1-a) & case\gamma \\ b_{AB}(a) + \Delta_1 b_{AB}(1-a) + \Delta_2 b_{AB}(a) & case\delta \end{cases} \quad [eq.\ 9]$$

In equation 9, b_{AB} (1-a) corresponds to $\Delta\_1$ b_{AB} (1-a)=0 in case δ, while it is as defined by equations 10 and 11 in the other cases.

$$\Delta_1 b_{AB}(1-a) = P(e_{AB}(1-a) - b_{AB}(1-a), b_{AC}(1-a) - b_{AC}(a)) \quad [eq.\ 10]$$

$$P(r, s) = \frac{r * s}{|s|^2} s \quad [eq.\ 11]$$

b_{AC} (a) corresponds to $\Delta\_2$ b_{AB} (a)=0 in case δ, while it is as defined by equation 12 in the other cases.

$$\Delta_2 b_{AB}(a) = P(e_{AC}(a) - b_{AC}(a), b_{AB}(1-a) - b_{AB}(a)) \quad [eq.\ 12]$$

The effective partial border line end point movement vectors are defined by equations 13 and 14.

$$d_{AB}(a)e_{AB}(a) - b'_{AB}(a) \quad [eq.\ 13]$$

$$d_{BA}(a)e_{BA}(a) - b'_{BA}(a) \quad [eq.\ 14]$$

where a=0 or a=1. The movement direction vectors of the entire effective partial border line are defined by equations 15, 16 and 17.

$$d_{AB}(t) = I(d_{AB}(0), d_{AB}(1); t) \quad [eq.\ 15]$$

$$d_{BA}(t) = I(d_{BA}(0), d_{BA}(1); t) \quad [eq.\ 16]$$

$$I(p, q; t) = (1-t)p + tq \quad [eq.\ 17]$$

Subsequently, using the solution of the vector equation with regard to A(t) and B(1−t) in equation 18, shared border lines G_{AB} and G_{BA} corresponding to partial border lines B_{AB} and B_{BA} are defined by g_{AB} (t) and g_{BA} (t) in equations 19 and 20.

$$b'_{AB}(t) + A(t)d_{AB}(t) = b'_{BA}(1-t) + B(1-t)d_{BA}(1-t) \quad [eq.\ 18]$$

$$g_{AB}(t) = b'_{AB}(t) + A(t)d_{AB}(t) \quad [eq.\ 19]$$

$$g_{BA}(t) = b'_{BA}(t) + B(t)d_{BA}(t) \quad [eq.\ 20]$$

In the example shown in FIG. 14, 1430 represents the shared border line with regard to the partial border lines 1413 and 423 of the maximum image projection ranges of projectors A and B. A range enclosed by shared border lines as calculated in this way is called an optimized image projection range; for example 1441, 1442, 1443, 1444 in FIG. 14 are optimized image projection ranges.

Here, the partial border lines of maximum image projection range S_A which should coincide with the partial border lines of the four projection ranges S_B, S_C, S_D and S_E adjacent to S_A are represented by B_{AB}, B_{AC}, B_{AD} and B_{AE}, respectively.

The shared partial border line with regard to B_{AX} (X∈{B, C, D, E}) is expressed as G_{AX} and defined by equation 21.

$$G_{AX} = \{g_{AX}(t) | t \in [0,1]\} \quad [eq.\ 21]$$

The range enclosed by border line=$G\_\{AX\}$ is called an optimized image projection range for the maximum image projection range S_A, and is expressed as Q_A.

T_A: S_A→Q_A, which denotes image transformation from maximum image projection range S_A to optimized image projection range Q_A, is defined as follows.

First, an isomorphism from S_A=[0, 640]×[0, 480] to D_2=[0, 1]×[0, 1] is expressed as π_A and is defined by equation 22.

$$\pi_A(x, y) = (x/640, y/320) \quad [eq.\ 22]$$

Next, an isomorphism from Q_A to D_2, expressed as ξ_A, is defined by equations 23, 24, 25 and 26 with respect to ∂ Q_A.

$$\xi_A(g_{AB}(t)) = (t, 0) \quad [eq.\ 23]$$

$$\xi_A(g_{AC}(t)) = (1, t) \quad [eq.\ 24]$$

$$\xi_A(g_{AD}(t)) = (1-t, 1) \quad [eq.\ 25]$$

$$\xi_A(g_{AE}(t)) = (0, 1-t) \quad [eq.\ 26]$$

Here, continuous transformation $\phi$: $D\_2 \to E\_2$ with respect to $\partial\, D\_2$ is defined by equation 27, where $E\_2$ represents two-dimensional vector space.

$$\phi_A(u,v)=\xi_A^{-1}(u,v)-\pi^{-1}(u,v) \qquad [\text{eq. 27}]$$

Then, $\phi$ (u, v) within $D\_2$ is defined by equation 28.

$$\phi_A(u, v) = I(I(\phi_A(u, 0), \phi_A(u, 1); v)), \qquad [\text{eq. 28}]$$

$$I(\phi_A(0, v), \phi_A(1, v); u); \frac{\rho(v)}{\rho(u)+\rho(v)}$$

where $\rho$ (x) denotes a continuous function, which is zero if x=0 or x=1, and defined, for example, by equation 29.

$$\rho(x)=x(1-x) \qquad [\text{eq. 29}]$$

Here, $T\_A$: $S\_A \to Q\_A$ for geometric transformation is defined by equation 30.

$$T_A(x)=\phi_A(\pi(x))+x \qquad [\text{eq. 30}]$$

Furthermore, the elements of the geometric transformation vector table in FIG. 10 are generated by transformation vector function $U\_A$ as defined by equation 31.

$$U_A(x) = \begin{cases} T_A^{-1}(x)-x & : x \in Q_A \\ 0 & : \text{otherwise} \end{cases} \qquad [\text{eq. 31}]$$

Figure 16:
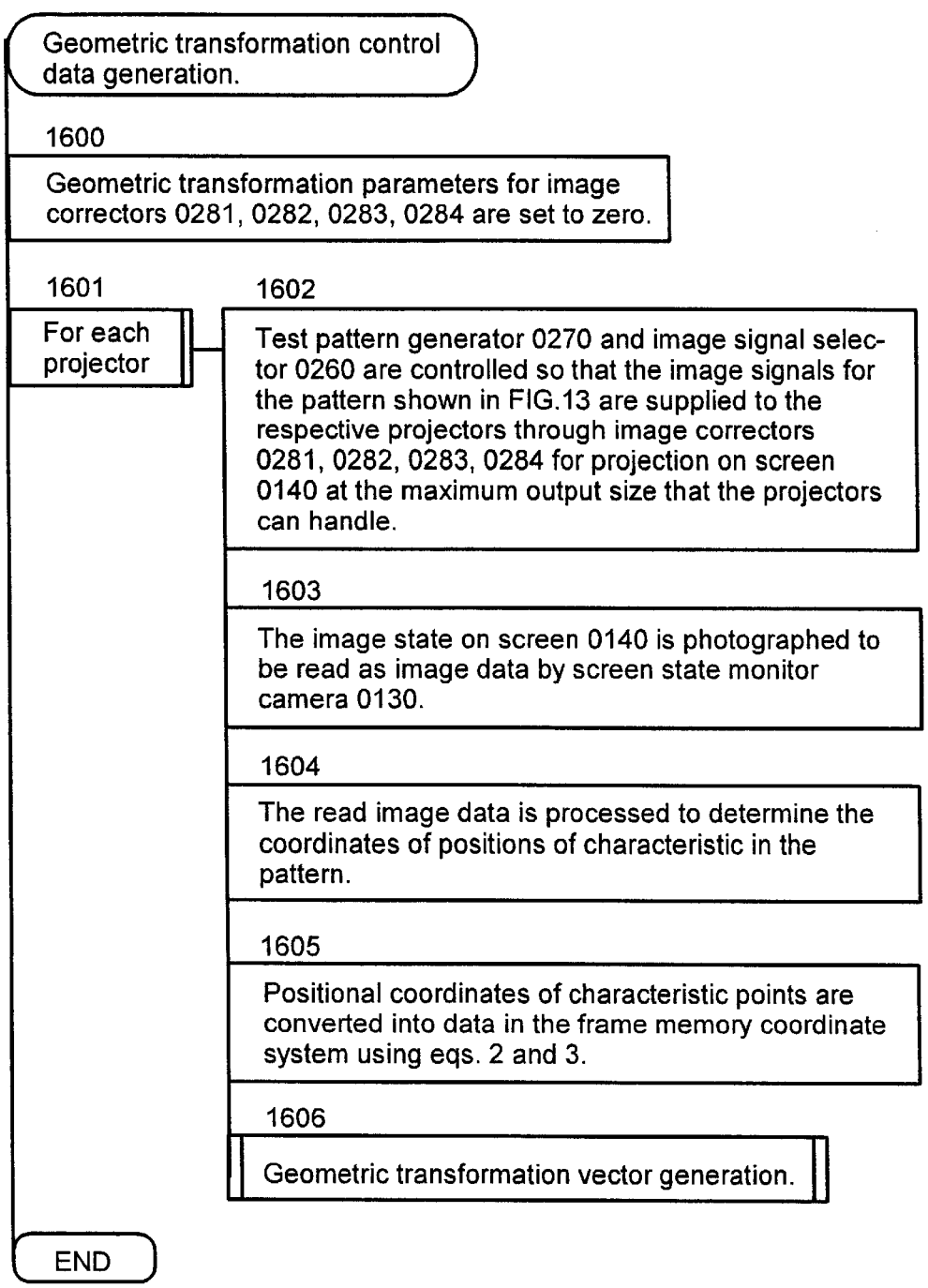
FIG. 16 is a flow chart of the sequence for geometric transformation control data generation.

FIG. 16 shows the control data generating sequence for geometric transformation in the image correction parameter generator 0290.

In step 1600, geometric transformation parameters for image correctors 0281, 0282, 0283, 0284 are set to zero. For each projector, the steps, 1602, 1603, 1604, 1605 and 1606, are carried out. In step 1602, an image of the pattern as shown in FIG. 13 is projected at the maximum size on the screen. In step 1603, the projected image in step 1602 is photographed by the screen state monitor camera 0130. In step 1604, the points corresponding to the apexes of the checkered pattern in FIG. 13 are read with respect to the camera coordinate system from the shot taken in step 1604. In step 1605, the characteristic point position coordinates are transformed to match the coordinate system of the image corrector frame memories. In step 1606, the geometric transformation vector generating sequence as shown in FIG. 17 is executed.

FIG. 17 shows the geometric transformation vector generating sequence. In step 1700, the point set on the border lines of the maximum image projection ranges defined by equations 4 and 5 is produced. In steps 1701 and 1702, effective partial border lines are calculated. In step 1703, the points to which the effective partial border line end points move are worked out. In step 1704, the end point movement vectors for the effective partial border lines are calculated.

In step 1705, the movement direction vectors for the effective border lines are worked out. In step 1706, the border lines of optimized image projection ranges are calculated. In step 1707, geometric transformation control parameters for the entire maximum image projection ranges are calculated.

The color reproduction quality of projected images varies from one projector to another and also depending on which position on the screen the image is projected on. The function of the color transformation block 0540 of each image corrector is to suppress these two types of variation and control the color reproduction quality so that the projected images from two neighboring projectors join end to end smoothly. The sequence for generating pixel data conversion parameters to be loaded into the color transformation block 0540, as shown in FIG. 12, will be explained next.

Here, on the above-said shared border lines included in the overlap area of the maximum image projection ranges of neighboring projectors $A$ and $B$, it is assumed that if z represents the color component value in displayed image data corresponding to the position where both the images should coincide ideally, f_X(z) represents the color component value as measured by the screen state monitor, camera 0130 with respect to z, where X denotes A or B.

Hence, optimized color component function $g(z)$ is defined by equations 32 and 33.

$$g(z)=(y_H-y_L)L(h(z);h(z_0),h(z_N))+y_L \qquad [\text{eq. 32}]$$

$$L(x; a, b) = \frac{x-b}{a-b} \qquad [\text{eq. 33}]$$

Here, y_H, y_L and h(z) are defined by equations 34, 35 and 36, respectively.

$$y_H=\min(f_A(z_H),f_B(z_H)) \qquad [\text{eq. 34}]$$

$$y_L=\min(f_A(z_L),f_B(z_L)) \qquad [\text{eq. 35}]$$

$$h(z) = \frac{f_A(z), f_B(z)}{2} \qquad [\text{eq. 36}]$$

The functions $\xi\_X(z)$ for color junction on the border line is defined by equation 37.

$$g(z)=f_x(\xi_x(z)) \qquad [\text{eq. 37}]$$

This color junction functions $\xi\_X(z)$ is approximated as an N piecewise linear function expressed by equation 1. In this case, the parameter for the i-th segment of the N piecewise linear function is given by equation 38.

$$(z_i, f_x^{-1}(g(z_i))) \qquad [\text{eq. 38}]$$

The color junction function for each point on the shared border line is defined in the above-mentioned way. Supposing that the color transformation function for each point (u, v) within $D\_2$ is represented by $\xi\_\{X[u, v]\}$ (z), the parameter data on the border line as defined by equation 38 is used to define the parameter data for the entire $D\_2$ area using equation 39 in the same way as equation 28.

$$\zeta_{X[u,v]}(z) = \qquad [\text{eq. 39}]$$

$$I\Big(I(\zeta_{X[u,0]}(z), \zeta_{X[u,1]}(z); v), I(\zeta_{X[0,v]}(z), \zeta_{X[1,v]}(z); u); \frac{\rho(v)}{\rho(u)+\rho(v)}\Big)$$

Then, the color junction function $\eta\_\{X[x, y]\}$ (z) for a position (x, y) in the maximum image projection range is defined by equation 40.

$$\eta_{X[x,y]}(z) = \begin{cases} \zeta_{X[\xi_x(x,y)]}(z) & : (x, y) \in Q_X \\ 0 & : \text{otherwise} \end{cases} \qquad [\text{eq. 40}]$$

The piecewise linear approximate parameter for the defined $\eta\_\{X[x, y]\}$ (z) is considered as the pixel data conversion parameter for a position (x, y) within the maximum image projection range.

Figure 18:
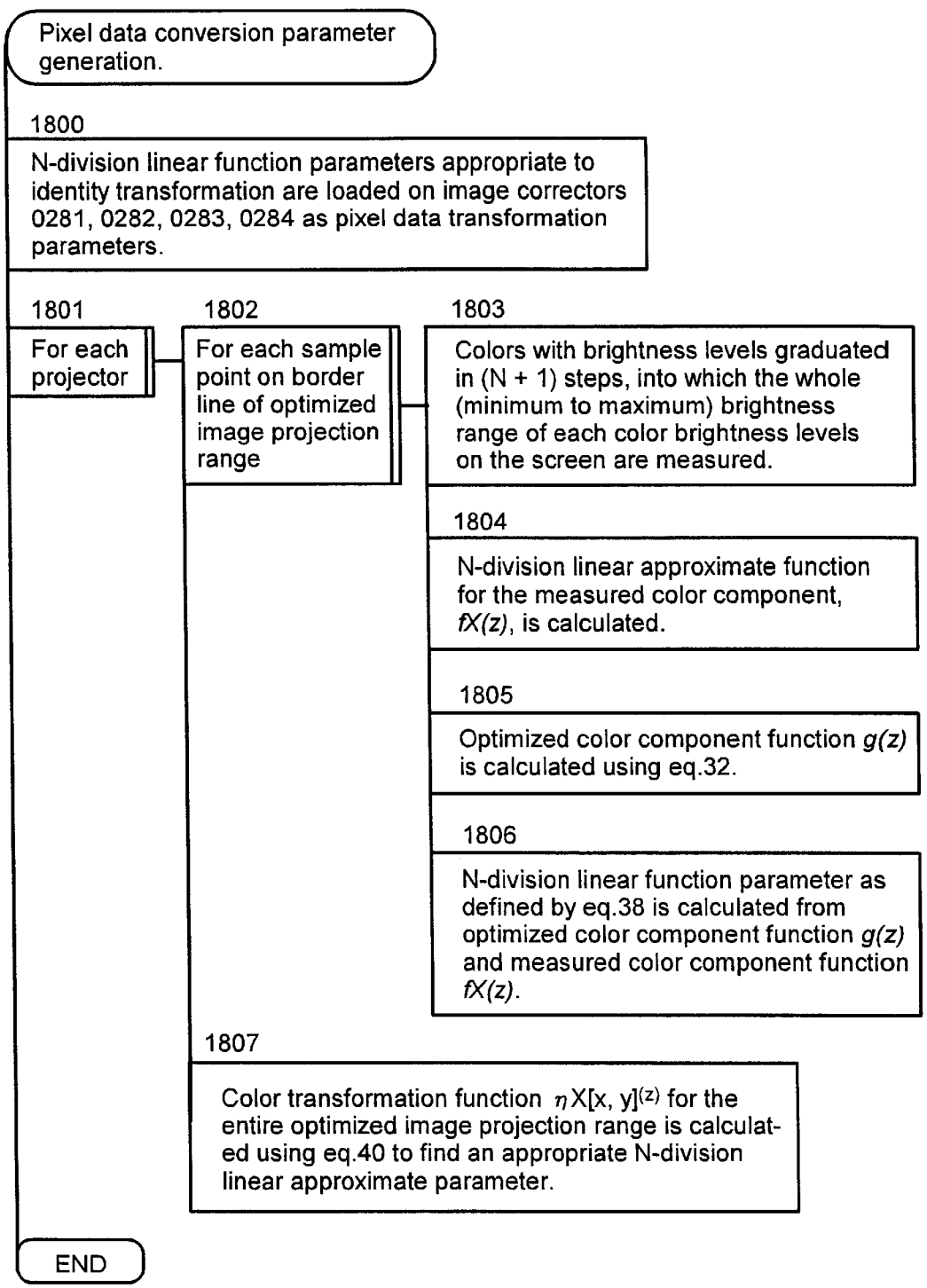
FIG. 18 is a flow chart of sequence for pixel data conversion parameter generation.

FIG. 18 shows the pixel data conversion parameter generating sequence in the image correction parameter generator 0290. In step 1800, parameters appropriate to identity transformation are loaded as defaults. The steps 1802 through 1807 are performed for each projector. Step 1802 is a step to control the repetition of steps 1803 through 1806 for each sample point on the borderline of the optimized image projection range. In step 1803, the brightness of each color component is measured. In step 1804, an N piecewise linear approximate function for the measured color component, f_X, is calculated. In step 1805, the optimized color component function is calculated. In step 1806, a pixel data conversion parameter on the border line is calculated. In step 1807, a pixel data conversion parameter for the entire optimized image projection range is calculated.

This embodiment produces an effect that neighboring projected images join end to end precisely without any gaps oroverlaps, and color discontinuity at the joint of the two images can be eliminated. Further, the required amount of image reshaping and the required pixel color transformation function are automatically calculated, which relieves the operator from the drudgery of manual repositioning of projectors and color adjustments.

As described next, a second embodiment of this invention has the same structure as the first embodiment except that the functionality of the image splitter 0250 as shown in FIG. 2 and the methods for calculating geometric transformation control parameters and pixel data conversion parameters are different.

Figure 19:
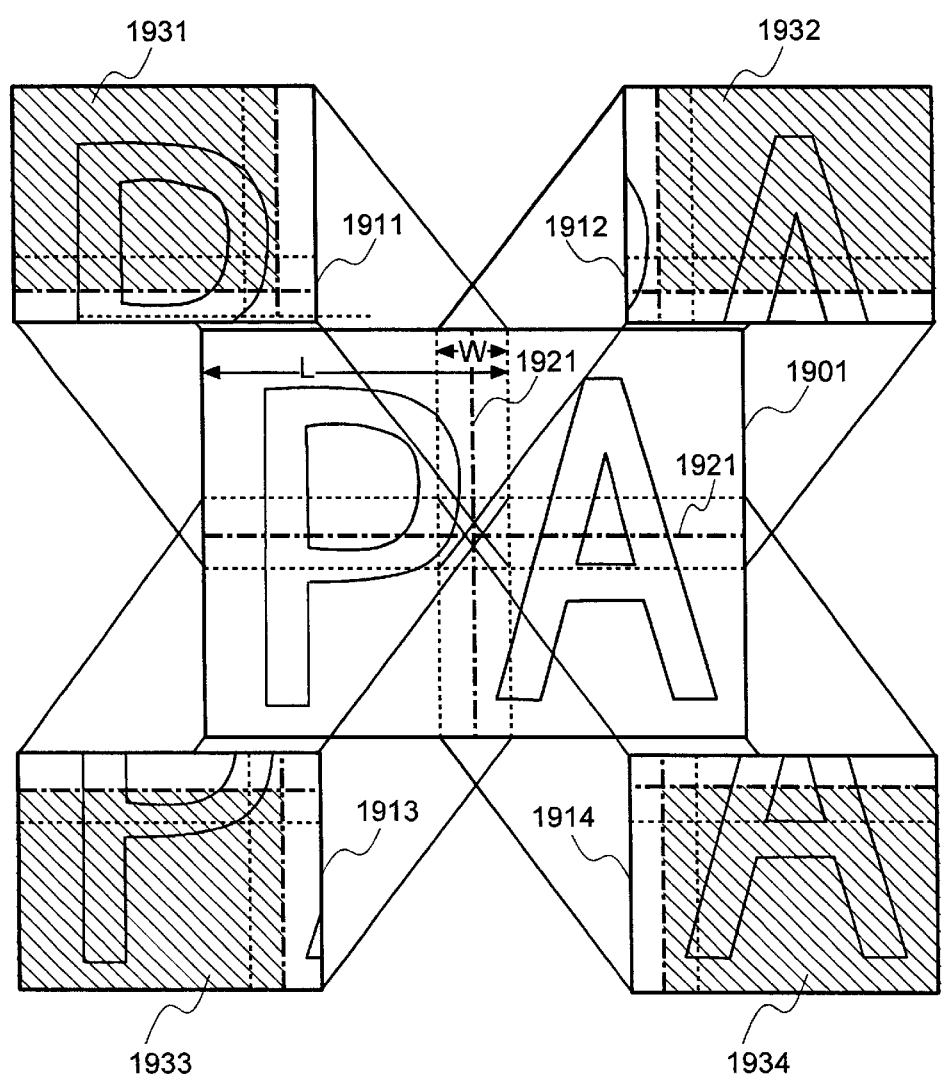
FIG. 19 is a diagram which shows an example of a picture composed of four mutually overlapping quarter images.

As shown in FIG. 19, the image splitter 0250 splits the image 1901 from the input image signal into partial images 1911, 1912, 1913, 1914 that each have a given amount of overlap with the other adjacent partial images, and generates image signals corresponding to these partial images.

The ratio of overlap width (W) to image length (L), W/L, is set to a ratio smaller than that of neighboring maximum image projection ranges. Conversely speaking, when this ratio W/L is so set, the projectors 0121, 0122, 0123, 0124 are positioned and angled so that the ratio of overlap of maximum image projection ranges 0151, 0152, 0153, 0154 is larger than the ratio of overlap of partial images W/L.

The area in each partial image which is enclosed by dividing centerlines 1921 and 1922 is called a major divisional area. In FIG. 19, the hatched areas 1931, 1932, 1933, 1934 are major divisional areas.

In this embodiment, the border lines of the major divisional areas 1931, 1932, 1933, 1934 are substituted for the partial border lines defined by equations 4 and 5 in the geometric transformation control parameter calculation as used in the first embodiment. Since geometric transformation T for points in the major divisional areas can be calculated using equation 30 as in the first embodiment, geometric transformation control parameters are calculated using equation 31. Calculation of geometric transformation control parameters for areas outside the major divisional areas is performed as follows.

Figure 20:
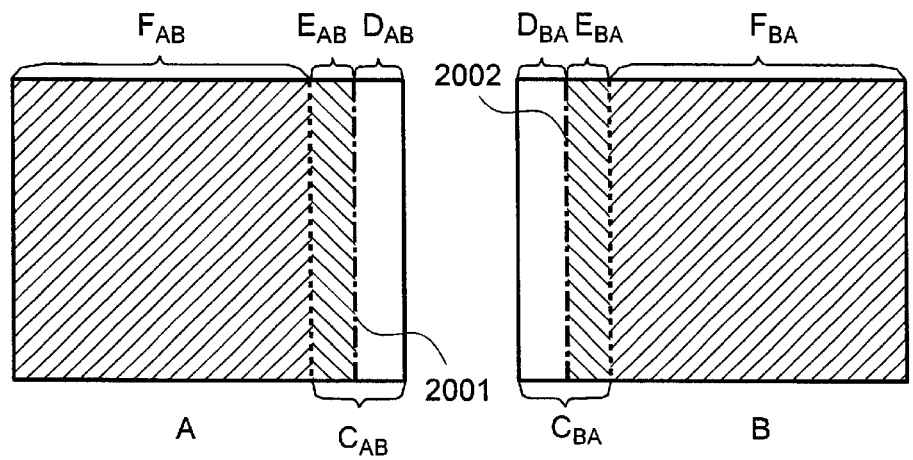
FIG. 20 is a diagram which shows the relationship of overlap areas of neighboring partial images.

In neighboring partial images A and B as shown in FIG. 20, it is supposed that the areas which overlap each other are represented by C_{AB} and C_{BA}, and the non-overlap areas by F_{AB} and F_{BA}. The C_{AB} and C_{BA} are each divided by the dividing centerlines 2001 and 2002 into two parts, which are expressed by equations 41 and 42, respectively.

$$C_{AB} = D_{AB} \cup E_{AB}$$ [eq. 41]

$$C_{BA} = D_{BA} \cup E_{BA}$$ [eq. 42]

Here, E_{AB} and E_{BA} each represent the sides of the overlap areas C_{AB} and C_{BA} (divided by the dividing centerlines 2001 and 2002) that border on F_{AB} and F_{BA}, respectively. Hence, the major divisional areas of the partial images A and B are expressed as E_{AB} ∪ F_{AB} and E_{BA} ∪ F_{BA}, respectively.

As indicated in the explanation of the first embodiment, Ψ_{AB}, a function for transforming coordinates in the coordinate system of the partial image B into those of the partial image A, and its inverse function Ψ_{BA} can be defined. Hence, the composite function V_{AB} to be defined on D_{AB} is defined by equation 43 using the geometric transformation function T_B for the partial image B as defined on E_{BA} ∪ F_{BA} by equation 30.

$$V_A(x) = \Psi_{AB}(T_B(\Psi_{BA}(x)))$$ [eq. 43]

A transformation vector function equivalent to equation 31, U_A, is defined by equation 44.

$$U_A(x) = \begin{cases} T_A^{-1}(x) - x & : x \in F_A \cup E_{AB} \\ V_{AX}^{-1}(x) - x & : x \in D_{AX} \\ 0 & : \text{otherwise} \end{cases}$$ [eq. 44]

Next, pixel data conversion parameters are calculated with the following procedure. First, for each point in the overlap area C_{AB}, the piecewise linear function defined by the parameter indicated in equation 38 is used to define the pixel data conversion function, as in the first embodiment.

$$F_A \cap_X F_{AX}$$ [eq. 45]

Then, regarding all neighboring partial images X, in the inside of F_A, an area which does not overlap any adjacent partial image, as expressed by equation 45, the pixel data transformation function is defined by interpolation with equation 39 using the pixel data conversion function as defined on the border as mentioned above. Thus, pixel data conversion function η_{A[x, y]}(z) can be defined by equation 46.

$$\eta_{A[x,y]}(z) = \kappa_A(x,y)\xi_{A[\xi_A(x,y)]}(z)$$ [eq. 46]

Figure 21:
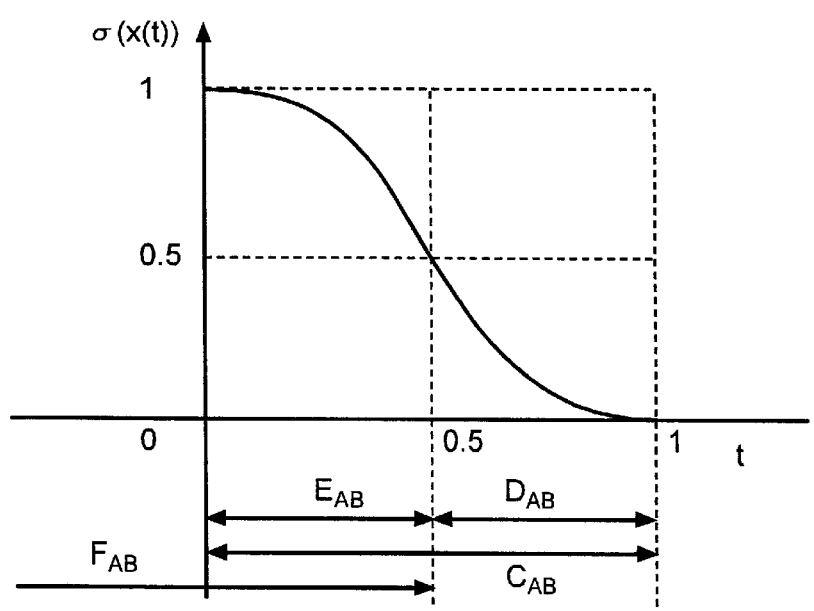
FIG. 21 is a graph showing a weight function used for brightness modulation of image overlap areas.

Here, weight function κ_{A}(x, y) is defined by equation 47 and is the product of σ_{A}(x, y) with regard to all partial images X adjacent to the partial image A.

$$\kappa(x, y) = \begin{cases} 1 & : (x, y) \in F_A \\ \prod_X \sigma_{AX}(x, y) & : (x, y) \in \exists C_{AX} \end{cases}$$ [eq. 47]

σ_{A}(x, y) is a function defined on C_{AB} that has a value as shown in FIG. 21 at point x(t) on line 2010 vertical to the dividing centerline 2001 as shown in FIG. 20 and a constant value in the direction parallel to the dividing centerline 2001.

As discussed above, the second embodiment is different from the first embodiment in the functionality of the image splitter 0250 as shown in FIG. 2 and the methods for calculating geometric transformation control parameters and pixel data conversion parameters.

According to the second embodiment, the overlap area of neighboring partial images is transformed into an image which gradually disappears from the inside toward the outside and their overlap areas with this same image characteristic are optically laid one upon another on the screen, so that the influence of partial image alignment error is exhibited as a blur in the joint between them.

On the other hand, in case of the first embodiment, the influence of partial image alignment error appears as a discontinuous or non-gradual change in the image joint. Since, due to the characteristics of the human sight, human beings are more sensitive to discontinuous image variation than to continuous image variation like blurs, the influence of image alignment error in the second embodiment is less perceivable to the human eyes than that in the first embodiment.

Figure 22:
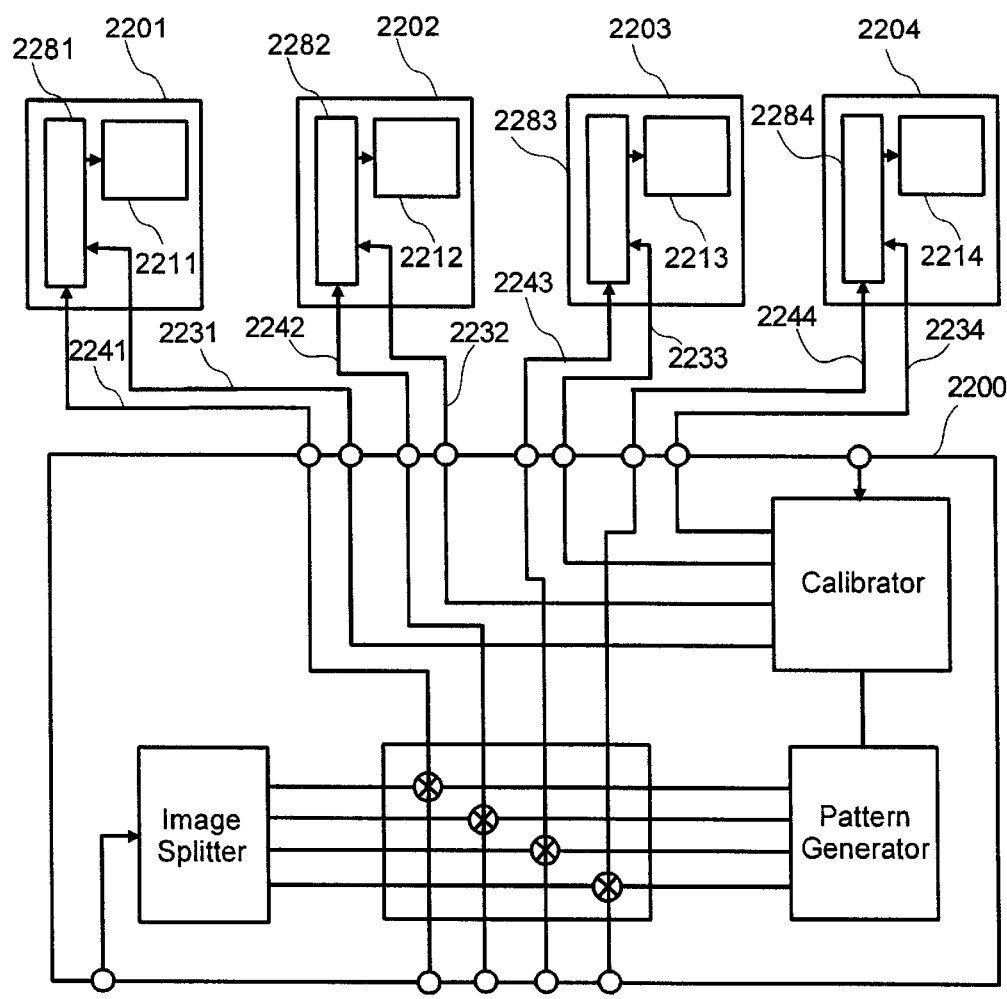
FIG. 22 is a block diagram showing projectors with image correctors built in and an image signal control unit.

A third embodiment of this invention has the same structure as the first embodiment except that the internal structure of the image signal control unit 0110 as shown in FIG. 2 and the functionality of the projectors connected to it are different. Referring to FIG. 22, a third embodiment will be is explained next.

In the third embodiment, each of projectors 2201, 2202, 2203, 2204 incorporates an image corrector with the same functionality as described for the first embodiment. In addition, the projectors are connected with two types of input signal lines: image signal lines 2241, 2242, 2243, 2244 and control signal lines 2231, 2232, 2233, 2234.

Like the first embodiment, the third embodiment also produces such an effect that neighboring projected images can join end to end without any gaps or overlaps.

Figure 23:
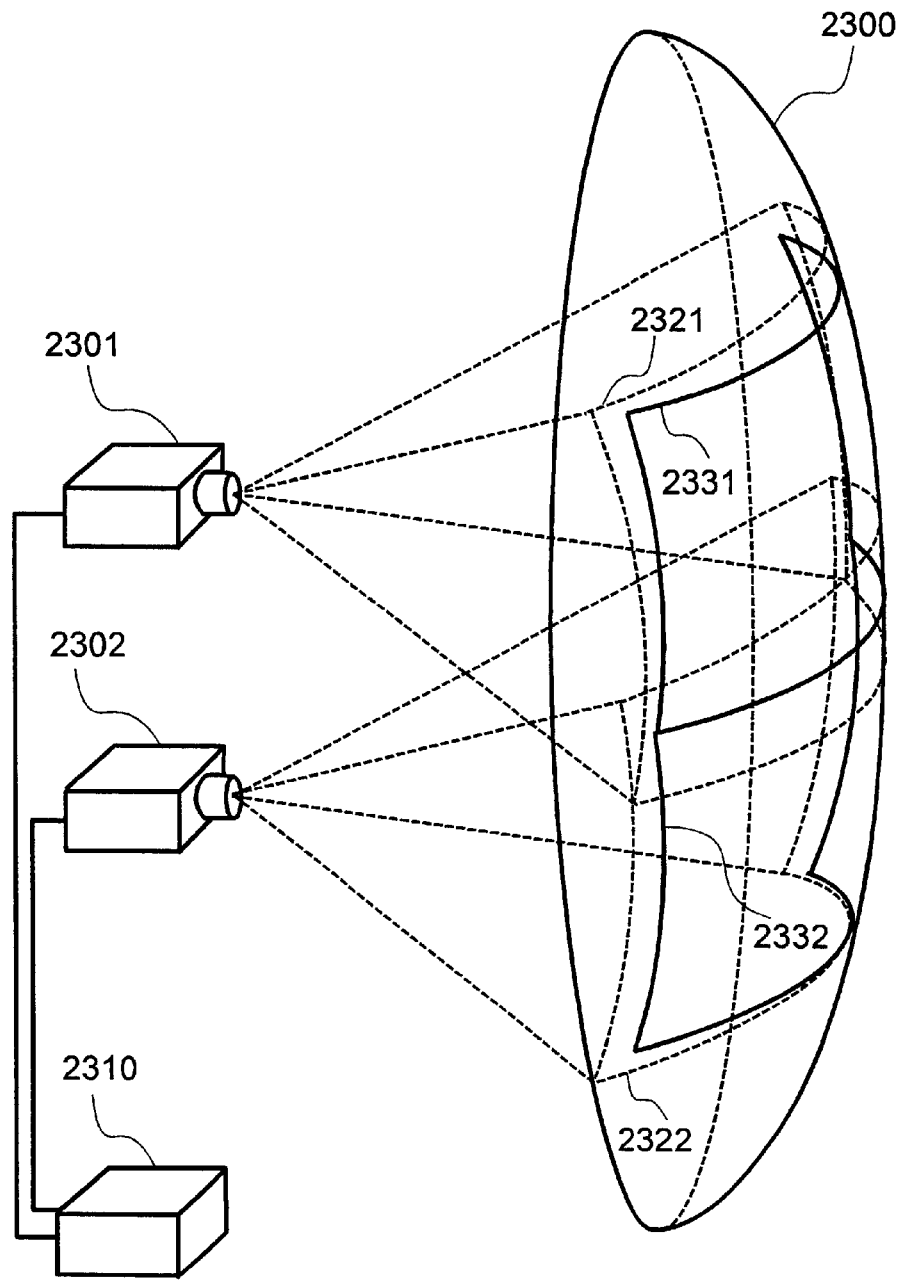
FIG. 23 is a diagram which shows an example of a multi-projection image display device that employs a curved surface screen.

A fourth embodiment of this invention will be described next, referring to FIG. 23. The fourth embodiment employs a non-planar screen.

A curved surface screen 2300 is used to enable projected images to efficiently cover the visual field of the viewer. Usually, if images are projected on a curved screen surface from projectors designed for projection on a planar screen, projected images will be rectangles whose sum of vertex angles is larger than 360 degrees, as illustrated here by maximum image projection ranges 2321 and 2322. Therefore, normally it is impossible to let the neighboring maximum image projection ranges 2321 and 2322 join end to end without any gaps or overlaps.

Projectors 2301 and 2302 are positioned so that the adjacent side of one of the two neighboring maximum image projection ranges 2321 and 2322 is included in the other's projection range as shown in FIG. 19, and image signals to the projectors 2301 and 2302 are controlled using the image signal control unit 2310 having the same functionality as explained for the first embodiment so that the neighboring projected images fit the optimized image projection ranges 2331 and 2332.

Figure 24:
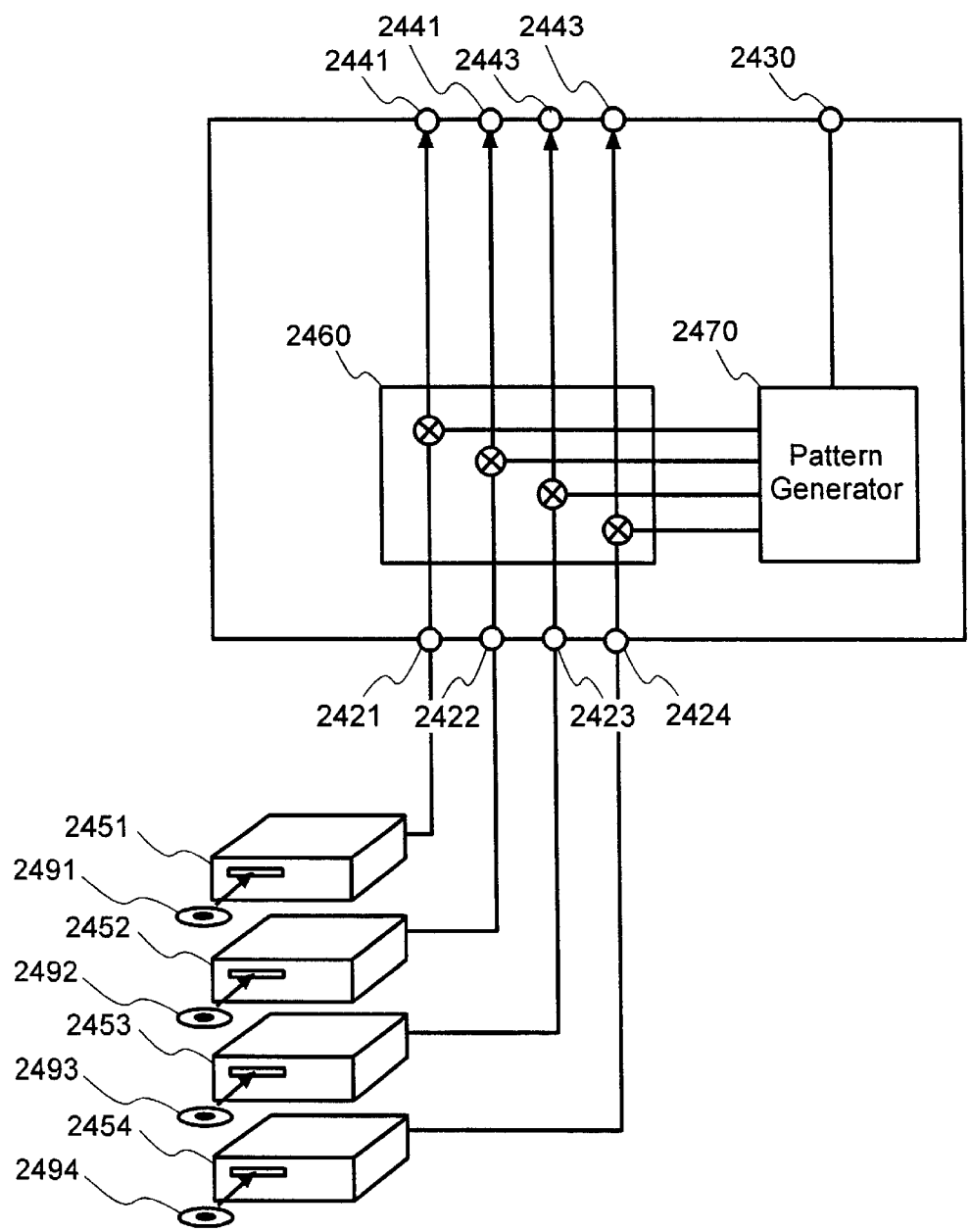
FIG. 24 is a block diagram showing a set of image reproduction units that reproduce partial image signals in parallel and an image signal control unit that has no image correctors.

A is a fifth embodiment of this invention which uses an image signal control unit 0110 similar to the one as described for the first embodiment, which, however, does not have image correctors 0281, 0282, 0283, 0284 as used in the first embodiment will be explained. The functional block diagram of the image signal control unit of the fifth embodiment is shown in FIG. 24. The image signal control unit has, as input/output terminals, partial image input terminals 2421, 2422, 2423, 2424, an input terminal 2430 for the screen state monitor camera, and partial image output terminals 2441, 2442, 2443, 2444. The image signal selector 2460 selects either image signals from the partial image input terminals or image signals from the test pattern generator 2470 and supplies the selected signals to the partial image output terminals. The respective partial image signals are supplied by image reproduction units 2451, 2452, 2453, 2454 (connected to the partial image input terminals) that reproduce images from visual media such as DVD-ROMs, 2491, 2492, 2493, 2494, which store image data to be dealt with by the respective projectors.

The image signal control unit as shown in FIG. 24 requires no image correctors. As mentioned earlier, due to such factors as the configuration of the screen, the positional relationship between projectors and the screen and the display characteristics of the projectors, image geometric transformation and image color characteristic transformation are necessary in order to join images project ed from the projectors smoothly. The first embodiment is designed to perform such image correction in real-time by means of hardware. In the fifth embodiment, however, pre-corrected image data for partial images to be dealt with by the respective projectors are stored in visual media like DVD-ROMs. The image reproduction units 2451, 2452, 2453, 2454 realize smooth image connection simply by providing pre-corrected image data to the projectors. Thus, image correctors are unnecessary according to the fifth embodiment of the invention.

Next, a sixth embodiment of the invention will be explained. The sixth embodiment uses image reproduction processors with image correction functionality as shown in FIG. 25 instead of the image reproduction units 2451, 2452, 2453, 25454 in the fifth embodiment.

Figure 25:
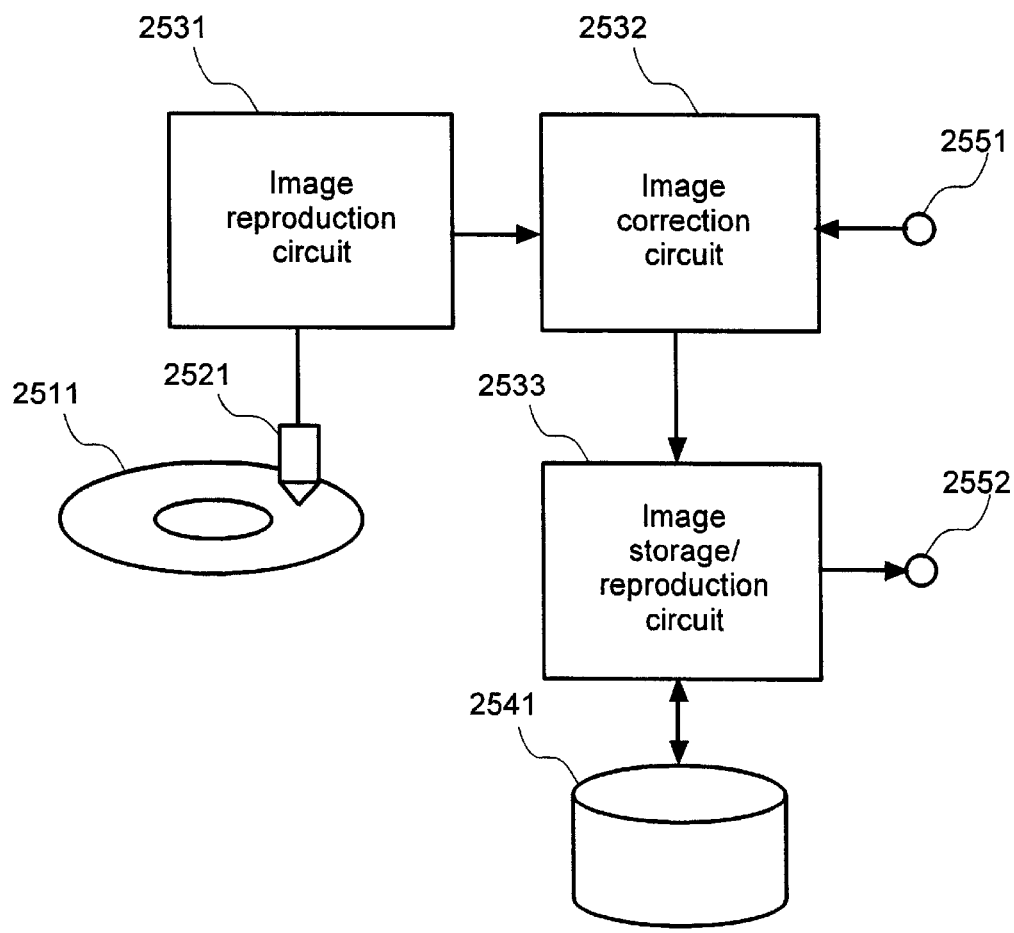
FIG. 25 is a block diagram of an image reproduction device that incorporates an image corrector and a temporary image storage unit.

As shown in FIG. 25, the sixth embodiment uses a different projector array system from that of the fifth embodiment. In the sixth embodiment, each image reproduction unit consists of the following: a pickup 2521 which loads image data from an image data storage medium 2511; an image reproduction circuit 2531 which decodes the signal detected by the pickup into image data; an image correction circuit 2532 which processes the image reproduction data according to image correction data inputted from an image correction data input terminal 2551; a medium 2541 which stores the processed image data; and an image storage/reproduction circuit 2533 which reads the processed image data from the temporary storage medium 2541 and sends it to an image output terminal 2552.

While the fifth embodiment cannot cope with a case in which the amount of image correction required for smooth image connection varies among individual projector array systems, the sixth embodiment solves the problem by enabling optimal image correction for each projector array system using the following sequence: the image correction circuit 2532 pre-corrects partial image data for each projector offline and the corrected image data is first stored in the temporary storage medium 2541; the stored corrected image data is read out from the temporary storage medium 2541 to realize smooth image connection on the screen.

According to the sixth embodiment, it is possible to join images end to end smoothly on the screen even if an image correction circuit which is too slow to perform real-time image correction, or software-based image processing emulation is used, while the first embodiment requires a processor for real-time image correction to realize smooth image connection. In addition, if the required amount of image correction differs among individual projector array systems, while the fifth embodiment is unable to join images on the screen properly, the sixth embodiment solves the problem by using the optimal amount of image correction for each projector array system.

According to these embodiments, images projected on a curved-surface screen can be smoothly joined.

Also, for maximum image projection ranges of neighboring projectors on said screen to overlap each other at least by a given amount, input image data which has been subjected to adequate geometric and color transformation is supplied to the projectors. This makes it possible to join projected images from several projectors smoothly with least conspicuous seams and to form a single whole picture on the screen, making precise positional and optical adjustments of projectors unnecessary.

Since means for performing real-time geometric and color transformation of image data depending on projector and screen characteristics are provided, smooth connection of projected images from several projectors to form a single picture can be realized just by controlling the image transformation means. To cope with variation in projector positions and optical system adjustments, this invention only carries out signal processing, thereby eliminating the need for optical and mechanical control means which would be more costly and more difficult in improving control accuracy than means for signal processing. As a result, the invention offers the advantage that a less costly, highly reliable multi-projection image display device can be realized.

Another advantage of the invention is to ensure cost reduction and improved accuracy in image adjustment work in comparison with conventional human visual inspection and manual adjustments, since the invention provides means to automatically control image transformation means by automatic calculation of required amounts of image geometric and color transformation for smooth connection of projected images from several projectors to form a single picture.

In addition, the theme of joining projected images from several projectors smoothly to form a single image is achieved by optical addition of rays of light from neighboring projectors so as to connect the overlap and non-overlap areas of neighboring projected images smoothly. This means that the influence of projector positioning errors or image geometric transformation means control errors appear as image blurs. Therefore, an advantage of the invention is to be able to make image defects as caused by such errors less conspicuous to the human eyes due to the fact that the human eyes are less sensitive to continuous image variation such as blurs than to discontinuous image variation because of the characteristics of the human sight.

If a projector incorporates an image data converter capable of performing at least geometric and color characteristic transformation of digitized image signal data based on input image signals, and an arithmetic control unit for controlling said image converter, it is possible to offer not only the same advantages as the multi-projection image display device as mentioned above, but also a further advantage: when each of said projectors is used as a separate unit, geometric transformation and brightness distribution alteration can be made on a projected image and even if the optical axis of the projector is not vertical to the screen, an image with an accurate image shape and precise brightness distribution can be reproduced on the screen. This lightens restrictions on the positional relationship between the screen and projector.

According to this invention, several images (data) can be joined to form one picture (or pictures) by the use of a relatively simple image display device, and joints of neighboring images can be made less conspicuous.

As discussed so far, the invention enables projected images from a plurality of image projectors to be joined and displayed as one picture (or pictures).

What is claimed is:

1. A multi-projection image display device for forming more than one display on a screen, comprising:

image projectors for projecting images on said screen; and data converters for performing at least geometric transformation and color display characteristic transformation according to the characteristics of said projectors and said screen.

2. The multi-projection image display device of claim 1, further comprising means for photographing images projected on said screen and, an arithmetic control unit for controlling said data converters so that positions on said screen are correlated with coordinates in the coordinate system representing pixel positions of the respective projected images from said image projectors according to image information based on shots made by said photographing means.

3. An image projection method for projecting images on a screen by a plurality of projectors, comprising the steps of:

cutting out or generating an image signal for a partial image to be dealt with by each projector from the image signal supplied to the projector; and correcting the image signal to perform geometric transformation for the image to be projected.

4. An image projection method for projecting images on a screen by a plurality of projectors, comprising the steps of:

cutting out or generating an image signal for a partial image to be dealt with by each projector from the image signal supplied to the projector;

monitoring the image on the screen; and correcting the image signal to perform geometric transformation for the image to be projected according to the monitored image.

5. A multi-projection image display device for forming more than one display on a screen, comprising:

image projectors for projecting images on the screen; and data converters for transforming at least a geometric characteristic of the image according to at least one of the characteristics of the projectors and the screen.

6. A multi-projection image display device for forming more than one display on a screen, comprising:

image projectors for projecting images on the screen;

a monitor camera for monitoring the image on the screen; and data converter for transforming at least a geometric characteristic of the image according to the monitored image.

* * * * *